United States Patent [19]
Blazey et al.

[11] Patent Number: 6,139,901
[45] Date of Patent: Oct. 31, 2000

[54] MEMBRANE FILTERED MILK PROTEINS VARYING IN COMPOSITION AND FUNCTIONAL ATTRIBUTES

[75] Inventors: Neil D. Blazey; Ralph J. Knights, both of Santa Rosa, Calif.; Chao Wu, Aimes, Iowa

[73] Assignee: New Zealand Milk Products (North Amerca) Inc., Santa Rosa, Calif.

[21] Appl. No.: 09/153,619

[22] Filed: Sep. 15, 1998

Related U.S. Application Data

[60] Provisional application No. 60/059,042, Sep. 16, 1997.
[51] Int. Cl.$^7$ ................ A23J 1/00; A23C 9/16; A23C 1/187
[52] U.S. Cl. ............ 426/656; 426/580; 426/588
[58] Field of Search .................... 426/656, 580, 426/588

[56] References Cited

U.S. PATENT DOCUMENTS

| | | |
|---|---|---|
| 3,882,256 | 5/1975 | De Boer . |
| 4,018,752 | 4/1977 | Bühler et al. . |
| 4,057,655 | 11/1977 | Okada et al. ............ 426/583 |
| 4,125,527 | 11/1978 | Buhler et al. . |
| 4,244,971 | 1/1981 | Wargel et al. . |
| 4,361,588 | 11/1982 | Herz ............ 426/104 |
| 4,376,072 | 3/1983 | Connolly . |
| 4,379,170 | 4/1983 | Hettinga et al. . |
| 4,689,245 | 8/1987 | Kosikowski et al. . |
| 5,008,376 | 4/1991 | Bottomley . |
| 5,143,741 | 9/1992 | Podolski et al. . |
| 5,260,080 | 11/1993 | Noel . |
| 5,409,725 | 4/1995 | Connolly . |
| 5,456,936 | 10/1995 | Toonen . |
| 5,503,864 | 4/1996 | Uchida et al. . |
| 5,503,865 | 4/1996 | Behringer et al. . |
| 5,639,502 | 6/1997 | Behringer et al. . |
| 5,707,678 | 1/1998 | Gregory . |
| 5,766,330 | 6/1998 | Knights et al. . |
| 5,831,079 | 11/1998 | Hanagata et al. ............ 536/124 |

FOREIGN PATENT DOCUMENTS 4360645  12/1992  Japan .

OTHER PUBLICATIONS

Encyclopedia of Food Science and Technology vol. 1, "Casein an caseinates", pp. 310–318 (1992).
Grafferty and Mulvihill, "Proteins recovered from milks heated at alkaline pH values", J. Soc. Dairy Technology, vol. 40, pp. 82–85 (1987).
N. Rajagopalan et al., "Total Protein Isolate from Milk by Ultrafiltration: Factors Affecting Product Composition", J. of Dairy Science 74, 1991, pp. 2435–2439.
Varmam and Sutherland, "Dairy Protein Products", Chapter 4, *Milk and Milk Products; Technology, chemistry and microbiology* (1964), Chapman and Hall, London, pp. 175–176.
Van Dijk, "The properties of casein micelles. 6. Behaviour above pH 9, and implications for the micelle model," Neth. Milk Dairy Journal (1992), vol. 46 pp. 101–113.
Singh and Fox, "Heat stability of milk: influence of colloidal and soluble salts and protein modification on the pH–dependent dissociation of micellar k–casein", Journal of Dairy Research (1987), vol. 54, pp. 523–534.

*Primary Examiner*—Anthony J. Weier
*Attorney, Agent, or Firm*—Knobbe, Martens, Olson & Bear LLP

[57] ABSTRACT

A process is described for treating an approximately neutral fluid milk composition, including milk protein concentrate and milk plus added whey, by selecting an alkali, adjusting the pH upward, heating, cooling, selecting an acid, and adjusting the pH down before ultrafiltering and, in a more preferred process, thereafter diafiltering the treated composition. Selection of the appropriate alkali, pH values, temperatures, acid, and membrane filter porosity results in improved yields of retentate proteins having selected compositions with improved utility, including a more palatable flavor, a brod range of solution viscosities, an increase in the solubility of the dried retentates in cold water to nearly 100%, and an increase in the calcium content of the membrane filtered retentate by about 50% compared to a similar retentate from standard milk. Appropriate selection of processing conditions can result in at least one filter permeate with a protein composition enriched in alpha lactalbumin, a protein that is highly beneficial for human nutrition.

35 Claims, 8 Drawing Sheets

Figure 1  30K Retentate Lactose, Untreated Milk and Model Equation Calculated Lactose Figure 2 30K Retentate Lactose, pH 8.5, 75C and Model Equation Calculated Lactose Figure 3  70K Retentate Lactose, Untreated Milk and Model Equation Calculated Lactose Figure 4  70K Retentate Lactose, pH 7.5, 87C and Model Equation Calculated Lactose Spray dried UF, DF retentate powder from milk preteated at pH 7.5 and 85° C, cooled, adjusted to pH 6.8 with sulfuric acid. Example 7A.

Spray dried UF, DF retentate powder from milk preteated at pH 9.5 and 65° C, cooled, adjusted to pH 6.8 with sulfuric acid. Example 7B.

Spray dried UF, DF retentate from milk without preteated or pH adjustments. Example 7C.

Spray dried skim milk.

MEMBRANE FILTERED MILK PROTEINS VARYING IN COMPOSITION AND FUNCTIONAL ATTRIBUTES

This application relates to Provisional Application Serial No. 60/059,042, filed Sep. 16, 1997.

BACKGROUND OF THE INVENTION

1. Field of the Invention

For the purposes of describing this invention, the background for this invention, and the examples contained herein, the term "milk" or "fluid milk" means skim milk or nonfat milk (as described in the U.S. Code of Federal Regulations, 21CFR 131), or concentrated skim milk prepared by evaporation or membrane filtration processes, or the fluid prepared from reconstituting powdered skim milk in water, or skim milk to which milk solids have been added for standardization purposes, or skim milk with added whey or whey protein concentrate. Use of this term "milk" is not meant to limit the invention but is meant as a general description of milk protein containing fluids that can be advantageously processed by this invention to produce the products having the beneficial characteristics derived from this invention.

2. The Prior Art

The proteins of milk are valued for nutritional and functional properties when used as ingredients in processed and prepared foods. The proteins are generally categorized into two classes with one class being a heterogeneous mixture called casein and representing approximately 80% of the proteins found in milk, and the second class being a heterogeneous mixture called whey proteins comprising the remaining approximately 20% of the proteins in milk. These proteins are separated from milk using a variety of chemical and physical processing techniques.

Casein is prepared by adjusting the pH of milk to near the isoelectric pH of casein at which pH the casein precipitates and can be collected free of the other soluble components of milk including whey proteins (see Swartz, Encyclopedia of Food Science and Technology, W. H. Hui, editor, Wiley & Sons, 1991, Volume 1, pages 310–318). In a variation of the precipitation technology, Connelly (U.S. Pat. No. 4,376,020) showed that the whey proteins could be made to interact with casein by treating the milk with alkaline and acid pH adjustments. The whey-casein complex thus prepared could be precipitated near the isoelectric pH of casein and the precipitated complex was collected and washed free of other soluble components. Grafferty and Mulvihill (J. Soc. Dairy Technology, 40, 82–85, 1987) reported on the recovery of milk proteins by acid precipitation (pH 4.6) of casein and whey protein complexes formed by heating milk at an alkaline pH. The insoluble acid precipitates are made into functional ingredients for foods by neutralizing with food grade alkaline agents.

Another type of precipitated whey-casein complex is described by DeBoer (U.S. Pat. No. 3,882,256) wherein milk is heated to greater than 90° C. to form the whey-casein complex. Calcium chloride is added to the heated milk to precipitate the whey-casein complex, and the precipitate is washed free of other soluble components from milk. Commercial ingredients made by these precipitation and solubilization technologies are typically called "caseinate", "total milk protein", "milk protein co-precipitate", or "milk protein isolate".

Alternatively, the whey protein and casein protein can simultaneously be separated from the small molecular weight components of milk (lactose, soluble minerals, peptides, nucleic acids, etc.) using porous membrane filters in a process called ultrafiltration (UF). Milk proteins are concentrated by applying pressure to the milk to force water and low molecular weight components through the porous membrane filter while the proteins, fat, and insoluble minerals are retained. Material passing through the membrane is termed the permeate, and material not passing through the membrane is termed retentate. Typically, milk proteins are concentrated by UF to a concentration two- to five-fold over the level in the starting milk. There is a limit to the potential concentration due to the viscosity of the retentate and the dynamics of the membrane filtration process.

Diafiltration (DF) is a similar membrane filtration process wherein water or other diluent is added to the concentrated retentate at or about the same rate that the permeate is removed. Thus, the volume of the retentate may not change much during the process of diafiltration, but the low molecular weight materials are continuously removed from the high molecular weight components in the retentate.

In the process described by Buhler, at al (U.S. Pat. No. 4,125,527) ordinary milk, heated milk, milk plus added whey, and milk adjusted to an acidic pH to enhance the removal of otherwise insoluble calcium salts, were processed by ultrafiltration and diafiltration techniques to concentrate and separate the whey and casein in the retentate using a membrane designed to retain components greater than 10,000 molecular weight.

BRIEF SUMMARY AND OBJECTS OF THE INVENTION

The process described in our invention provides an enhanced separation of small molecular weight and large molecular weight components of milk by adding alkali to adjust the pH above the natural pH of milk and below about pH 10 and heating the composition. It is preferable that pH adjustment and heating precede cooling the milk and thereafter subjecting the cooled milk to UF and/or DF at a near neutral pH or a slightly acidic pH. The described treatment of milk prior to membrane filtration enhances the separation of small and large molecular weight components and provides a filtration retentate that is a protein concentrate with a composition and functional performance not otherwise provided by current processing art. Furthermore, selection of processing conditions combined with selection of UF and DF membranes (that is selection of the membrane porosity or molecular weight cut-off) provides one or more permeate compositions with unique protein compositions, and these permeates can be further processed using current art to provide unique nutritional and functional protein ingredients.

Careful selection of the alkali and the acid used for the pH adjustments prior to UF and DF can provide a retentate with a beneficially increased calcium to protein ratio suitable for making nutritional compositions without the further addition of insoluble calcium salts that tend to settle out or separate from balanced nutritional beverages. Also, by selection of the alkali and acid, the calcium and phosphate content of the retentate can be lowered, relative to the protein, giving a milk concentrate with reduced opacity or with a composition, for instance, similar to cheese and thus providing a unique ingredient for that food application. By selecting the alkali and heat treatments, the milk protein micelle structure can be modified with the resulting protein concentrate made suitable for high viscosity applications or for foods where thickening is desired.

It is the general object of the present invention to provide milk concentrates with unique compositions, that is, compositions with unique ratios of the casein to whey proteins and with unique ratios of minerals to protein, while employing the techniques of ultrafiltration and diafiltration. Furthermore, it is a general object of this invention to provide a more efficient or more effective removal of the milk carbohydrate, lactose, from the protein retained by the UF and DF membranes. It is also an object of this invention to provide a diverse range of physical and functional properties to milk concentrates prepared by membrane filtration.

According to the present invention, nonfat milk, or any of the derivatives of "milk" as described above, in fluid form, is alkalized to a pH above that of the ordinary pH of milk, i.e., about pH 6.6, and approximately pH 10, the preferred pH being in the range of about 7.5 to 8.5. The alkaline pH allows for the partial solubilizing of the various protein fractions present in the milk, without disrupting or destroying substantially the micelle structure of the major milk proteins and insoluble salts of milk. The alkaline agent can be chosen from any of those approved for food use by the Food Chemical Codex, the preferred alkaline agents being sodium hydroxide, calcium hydroxide, magnesium hydroxide, or some combination thereof. The composition is then heated to a temperature between 60° C. and 90° C., the preferred temperature being in the range of about 75° C. to 85° C. It is believed that the combination of temperature and alkaline treatment causes the whey proteins to associate with the caseins to provide a complex not otherwise present in untreated milk. It is not necessary to hold the milk composition at the elevated temperature for any specific period of time, although a holding period of about 5 to 15 minutes is preferred.

After this holding period, the heated composition is then cooled to a temperature between about 5° C. and 25° C., the preferred temperature being approximately 15° C. The pH of this composition is then adjusted to near neutral or to a slightly acidic pH, i.e., between about pH 7.5 and pH 5.5, with the preferred pH being about pH 6.5 to 7.2, unless a low calcium version of the invention is desired. Low calcium versions are produced when the pH prior to ultrafiltration and diafiltration is slightly acidic, the preferred pH being about pH 5.5 to pH 6.2. The acidifying agent can be chosen from any of those approved for food use by the Food Chemical Codex, the preferred acids being hydrochloric, phosphoric, citric, and sulfuric acids, with the selection being dependent upon economic choices and the desired composition and functional properties, principally of the retentate, but also of the permeate.

The composition is then processed by otherwise conventional techniques using ultrafiltration and diafiltration membranes, the preferred construction being a spiral wound module, with a manufacturing specified molecular weight cut-off of between 10,000 and 150,000, the preferred molecular weight cut-off range being 30,000 to 70,000 for a high recovery of the whey proteins with the casein and a preferred molecular weight cut-off less than 50,000 for recovery of certain of the whey proteins in the permeate fraction.

Ultrafiltration or ultrafiltration combined with diafiltration results in the collection of a retentate and one or more permeates. It is not necessary to concentrate the milk proteins in the retentate, relative to total solids, to any specific level, the level of concentration being dependent on the desired composition of this retentate and the intended use of the liquid or subsequently dried milk protein concentrate. Typically, ultrafiltration, as a single process, is continued until the volume of the retentate is between one-half and one-fifth of the original fluid milk volume, this being referred to as a "Volume Concentration Factor" (VCF), of two to five, respectively. For use of the processed concentrate in standardization of cheese milk, processed cheese, or as an ingredient in frozen desserts and certain nutritional liquids, a VCF of two to three is sufficient. Reduction of the lactose content of the retentate to be a minor or relatively insignificant component of the concentrate is achieved by ultrafiltration and diafiltration to a high VCF, 100 to 300, more preferably 150 to 200.

The protein content of the UF and DF permeates is dependent both on the pretreatment of milk as described in this invention and the selection of the membrane. Permeates that are substantially free of protein can either be disposed of, dried, or utilized in industrial applications. Permeates containing proteins that, by the process of this invention, were not interacted with the casein proteins can further be processed by precipitation techniques, membrane processing, or ion exchange chromatography to concentrate or isolate the protein component while the rest of the permeate can either be disposed of, dried, or utilized in industrial applications. Permeates can be collected during the individual ultrafiltration and diafiltration processing steps or the permeates from these two processing steps can be combined.

Diafiltration may utilize water, salt solution, dilute carbohydrate solution, or other appropriate diluents for the retentate with this diluent added to the retentate during the diafiltration processing at about the same rate that permeate is removed. The preferred diluent is water and the preferred rate of addition to the retentate is the same as the rate of permeate removal.

The proteins in the liquid retentates are present in different forms than the proteins in comparable retentates resulting from UF and DF of untreated skim milk. In the present invention, the protein of the retentate is present as a combination of the natural micelles of milk, micelles of milk interacted with the whey proteins, whey protein aggregates, whey protein in the natural form found in milk, and protein-mineral complexes, especially protein-calcium complexes, resulting from the alkali and heat treatments. The retained protein of the present invention demonstrates markedly different physical and functional properties compared to those properties exhibited by the protein retentate obtained from untreated skim milk. By selection of the conditions for treating milk, the physical and functional properties of the retentate can be adjusted to be more opaque or less opaque than protein from untreated milk, to be more heat stable or less heat stable than the proteins from untreated milk, to be more viscous or less viscous, or to have more calcium or less calcium than the protein or retentate obtained from UF and DF of untreated skim milk. The proportion of casein and whey proteins in the retentate of the present invention can further be adjusted by adding dairy whey or whey protein concentrate to the nonfat milk prior to subjecting the fluid to the process of this invention, thus producing milk protein concentrates with a higher level of whey protein than would be obtained from processing standard skim milk.

Careful selection of the acid and the final pH prior to UF and DF can result in altering the ash content and the calcium to protein ratio of the retentate. Use of an acid that can complex with or solubilize the calcium phosphate of milk, the preferred acid in this case being citric acid, will result in a low ash content and a low calcium content in the retentate. Also, adjusting the final pH before UF and DF to a value between 5.5 and 6.5, preferentially about pH 6.2, will also result in a reduction of the ash content and a reduction of the calcium content of the retentate. These retentates are less viscous, less opaque, and substantially more heat stable than the retentate from untreated skim milk.

The retentate resulting from the present invention may be utilized as an ingredient in food without further processing, or the retentate can be dried using conventional techniques. Prior to drying, the retentate may be further concentrated by removing water through either an evaporative or a membrane process.

Analytical Methods and Definitions

The solids content of fluid samples was measured using a microwave solids analyzer from CEM Corp., Model AVC 80. Protein content of fluid samples was measured using Coomassie dye and the procedure described by Sigma Diagnostics, Catalog No. 610-A. The protein content of powder samples was measured by a Kjeldahl technique for nitrogen analysis. Lactose content of fluid samples was measured using the Phenol-Sulfuric acid technique. Lactose content of powdered samples was measured by both the Phenol-Sulfuric acid technique and by High Pressure Liquid Chromatography (HPLC). Ash is the material remaining after heating a powder sample to greater than 500° C. Calcium was measured by ion coupled plasma photometry. The concentrations of specific whey proteins, alpha-lactalbumin, and beta-lactoglobulin, in fluid permeates and retentates was measured using an HPLC technique with a TSK 2000 SW XL column, phosphate buffer with NaCl, and UV detection at 214 nm. Monomeric alpha-lactalbumin and beta-lactoglobulin standards (Sigma Chemical) were used in the quantification technique.

Flavor scores and the ranking of products for opacity and whiteness were provided by an eight member trained sensory panel. Solubility was a measure of the amount of powder dissolving in water at either 20° C. (cold water solubility) or at 60° C. Heat stability was assessed by recording the amount of insoluble protein after retorting a 5% solids sample at 250° F. for five minutes. Dispersibility is a measure of the time (in seconds) for 95% of 5 grams of powder to be evenly distributed as a water solution or suspension in 95 grams of stirred water at 25° C. Viscosity was measured on suspensions or solutions in water at 15% solids.

To demonstrate the effects of this invention on the efficient removal of lactose during ultrafiltration and diafiltration, the lactose content of the retentate was plotted against a volume concentration parameter defined by Rajagopalan and Cheryan (J. Dairy Sci., 74, 2435–2439, 1991). For ultrafiltration:

$$VCR = V_O/V_R$$

where $V_O$=original volume $V_R$=retentate volume=$V_O - V_P$ $V_P$=permeate volume For diafiltration:

$$V_D = V_P/V_R$$

The lactose content of retentate (or permeate) was measured and compared to the lactose concentration predicted by the Volume Parameter and rejection coefficient.

$$\text{Volume Parameter} = V_D - (1/VCR) = (V_P/V_R) - (V_R/V_O)$$

Also, $$\text{lactose} = (\text{original lactose}) \times \exp(-V_D(1-R))$$

Where $V_D$ is defined above and R is the membrane rejection coefficient for lactose.

DETAILED DESCRIPTION OF THE PREFERRED EMBODIMENT

Example 1

Figure 1:
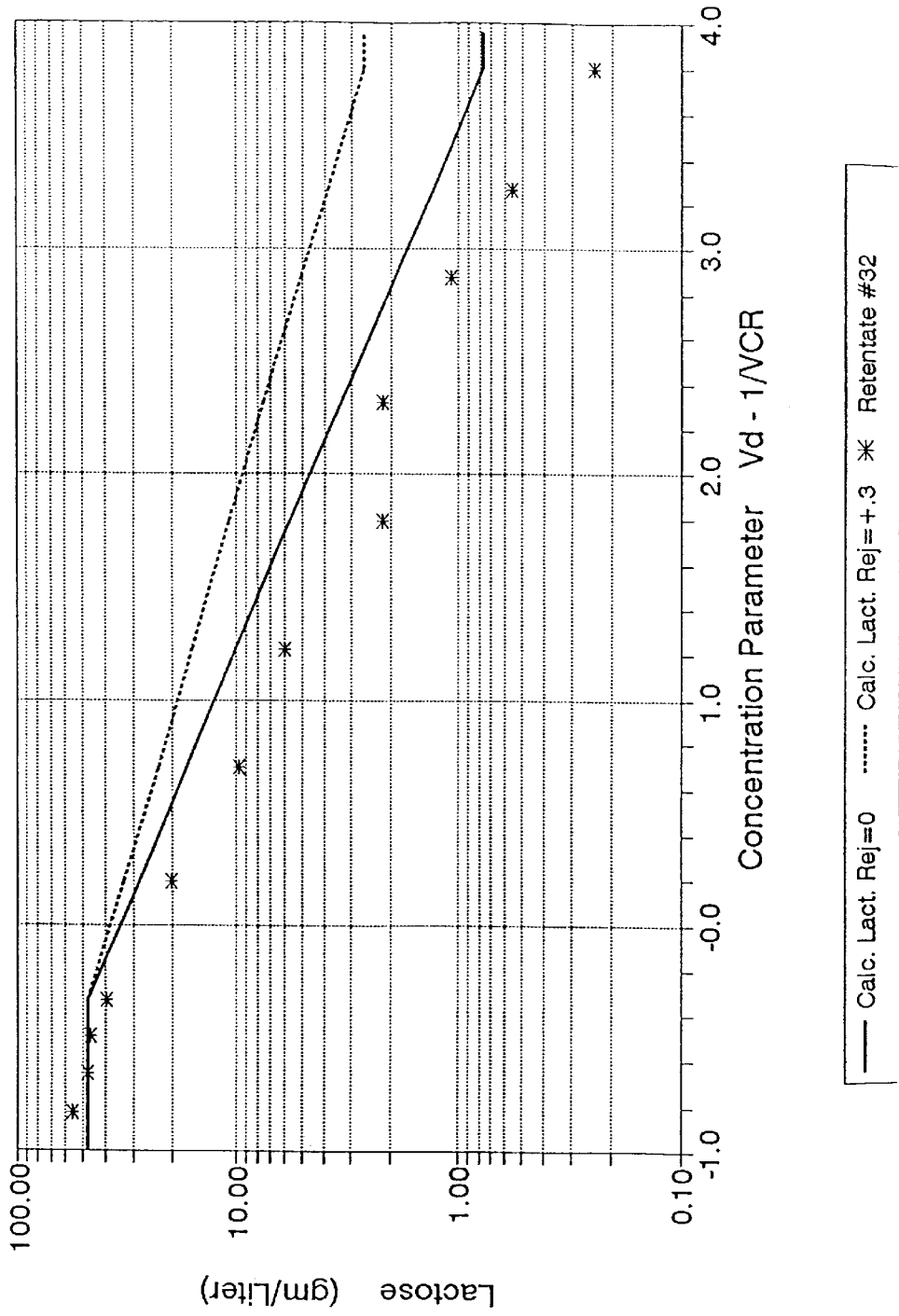
FIG. 1 is a plot of lactose content of the retentate plotted against the calculated Volume Parameter described by Rajagopalan and Cheryan, J. Dairy Sci., 74, 2435–2439, 1991). Data are from Example 1 where the milk, prior to UF and DF was treated by raising the pH to 8.5, heating to 75 degrees C., cooling, and lowering the pH to 6.8 with sulfuric acid. UF and DF on a 30,000 MWCO membrane. Two theoretical lines were calculated from the initial lactose content, the Concentration Parameter, and assuming a rejection coefficient for lactose of either 0 (solid line) or 0.3 (broken line).

344 pounds (40 gallons) of pasteurized, nonfat fluid milk was adjusted from the natural pH of milk (approximately pH 6.5) to pH 8.5 by the addition of 4.1 pounds of 2N sodium hydroxide. The temperature of the mix was then increased to 75° C., and the fluid held at that temperature for five minutes. The vessel and the fluid were then cooled to 25° C. by the addition of 24 pounds of ice and the application of cooling water circulated through the vessel jacket. The pH of the mix was adjusted to 6.8 by the addition of 4.6 pounds of 0.5M sulfuric acid while vigorously agitating the fluid. The temperature of the approximately 380 pounds of fluid was further reduced to approximately 15° C. and the treated milk processed by ultrafiltration in a Niro Ultrafiltration Pilot Plant model PA660A equipped with PES spiral wound membranes with a molecular weight cut-off of 30,000 from Advanced Membrane Technology, Inc. By ultrafiltration, the weight (or volume) was reduced to one-third of the original weight accompanied by collection of 240 pounds of permeate.

Following the three-fold reduction in the fluid volume, diafiltration was started by adding a total of approximately 420 pounds of deionized water to the retentate at the same rate that permeate was removed so as to maintain a constant volume of retentate. Following the diafiltration process, the retentate was concentrated by an ultrafiltration process which reduced the volume (or weight) by another factor of two. The final retentate was then collected by draining the membrane module and flushing the module with deionized water. This composition was then spray dried to produce a powdered ingredient.

In order to follow the course of processing, and in order to compare one pretreatment to another, several samples of permeate and retentate were taken for analyses during ultrafiltration and the subsequent diafiltration processing. Certain analyses were also performed on the powder obtained after drying and on the composite UF permeate, the composite DF permeate, and the retentates at the end of the UF and DF stages.

Table 1A shows more details of the volume and milk component concentration measurements made during the processing of Example 1 and this table includes data on the processing of untreated skim milk in the same membrane module.

TABLE 1A

PRETREATMENT, PROCESSING, AND YIELD
COMPARED TO AN UNTREATED CONTROL MILK

| | Example 1 | Control |
|---|---|---|
| Milk (gallons) | 40 | 40 |
| (pounds) | 344 | 344 |
| 2N NaOH (pounds) | 3 | — |
| Alkaline pH | 8.5 | — |
| Temperature | 75° C. | — |
| Time | 5 minutes | — |
| 0.5M $H_2SO_4$ (pounds) | 6 | — |
| Final pH | 6.8 | 6.6 |
| UF permeate (pounds) | 251 | 240 |
| UF retentate (pounds) | 120 | 120 |
| DF permeate (pounds) | 490 | 496 |
| DF diluent (pounds) | 490 | 496 |
| UF VCF | 3 | 3 |
| DF equivalent VCF | 60 | 60 |
| Second UF VCF | 2 | 2 |
| Total equivalent VCF | 360 | 360 |
| Retentate protein (grams) | 5360 | 5350 |
| UF permeate protein (grams) | 215 | 260 |
| Retentate protein yield (%) | 96 | 95 |

Figure 2:
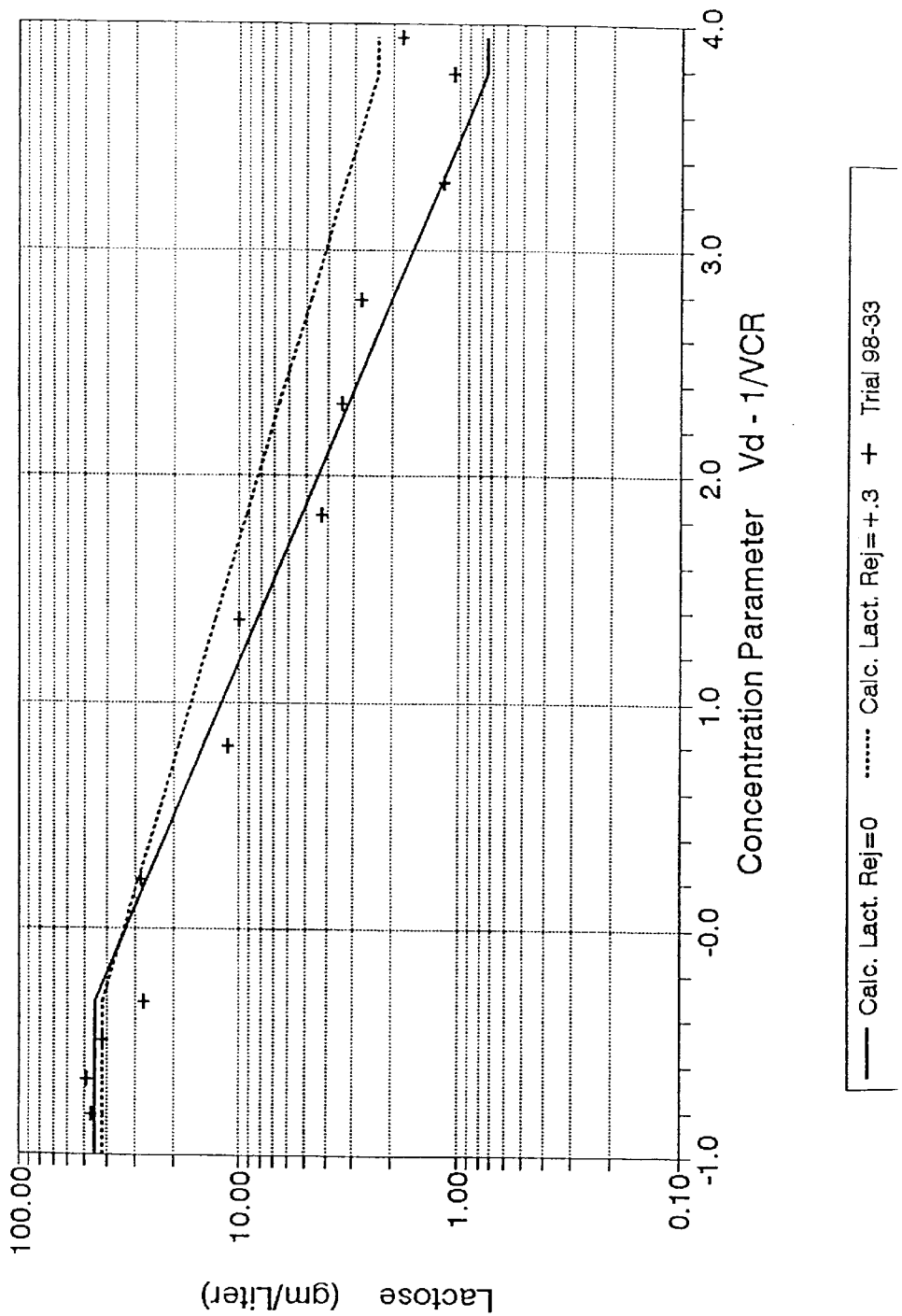
FIG. 2 is a plot of lactose content of the retentate plotted against the calculated Volume Parameter described by Rajagopalan and Cheryan, J. Dairy Sci., 74, 2435–2439, 1991). Data are from untreated milk processed on the 30,000 MWCO membrane, like Example 1. Two theoretical lines were calculated from the initial lactose content, the Concentration Parameter, and assuming a rejection coefficient for lactose of either 0 (solid line) or 0.3 (broken line).

Removal of lactose from the retentate of milk treated by this invention is shown in FIG. 1 and removal of lactose from untreated skim milk using the same membrane filtration technique is shown in FIG. 2.

The data in each figure are accompanied by two theoretical lines for lactose removal by membrane filtration calculated from equations adopted from Rajagopalan and Cheryan (see methods above). The theoretical lactose concentration in the retentate is dependent on the UF and DF volume measurement and also on an assumed rejection coefficient for lactose. Rejection coefficients generally range from zero to one with a value of zero assigned to components that pass through the membrane unaffected by the membrane properties and a value of one assigned to large components which do not pass through the membrane at all. For the treated milk of this invention, the rejection coefficient for lactose (see FIG. 1) appears to be approximately zero, that is, the removal of lactose from the retentate is not inhibited by the membrane or by coating of the membrane by the proteins of the retentate. Within experimental error, the rejection coefficient for lactose for the untreated milk (FIG. 2) is also about zero.

The composition, functional properties, and flavor scores for the powder produced by the Example 1 process and a powder produced from untreated skim milk are shown in Table 1B.

TABLE 1B

POWDER COMPOSITION AND PROPERTIES
FOR UF AND DF TREATED AND UNTREATED MILKS, 30K MEMBRANES

| Treatment | | | Powder Composition | | | | Powder Properties | | | | |
|---|---|---|---|---|---|---|---|---|---|---|---|
| Alkali | pH | Temperature (° C.) | Protein % | Lactose % | Ash % | Calcium % | Dispersibility (sec) | Solubility % @ 20° C. | Solubility % @ 60° C. | Viscosity (cP) (@ 15% solids) | Flavor Score |
| Na | 8.5 | 75 | 89.2 | 0.5 | 7.3 | 2.2 | 45 | 92 | 99 | 33 | 7.0 |
| — | — | — | 90.1 | 0.1 | 6.5 | 2.1 | 75 | 78 | 98 | 11 | 6.4 |

Compared to the product resulting from untreated skim milk, the product made by the present invention has approximately the same composition, but has the unexpected advantages of a more rapid cold water solubility and a higher, more desirable flavor score. Rapid cold water solubility is advantageous when the ingredient is used as a part of a powdered nutritional beverage mix, when the ingredient is used to supplement milk for cheesemaking, and when the ingredient is used in other food applications that require full dissolution of the protein ingredient in order to provide aesthetic and functional performance.

Example 2

Forty gallon samples of pasteurized skim milk were individually treated by the sequence of processing steps described in Example 1 and using the alkali, temperature, and acid treatments described in Table 2A.

The treated milks were ultrafiltered and diafiltered in the same fashion as described in Example 1. All of the treated milks (Table 2A, samples A through H) and the untreated skim milk in this example (Table 2A, samples I and J) were processed using a 30,000 molecular weight cut-off, spiral wound membrane module. The membrane module was thoroughly cleaned between each sample that was processed by flushing the module with caustic, water, acid, water, alkaline protease, and water. Samples were taken for analysis during the UF and DF processing, and a sample of the powdered product from spray drying each of these samples was also taken for analysis. The compositions, solubility, heat stability, viscosity at 15% solids, flavor evaluation, and the specific whey protein content of the UF and DF permeates for the treated milks and the untreated milk samples are shown in Table 2B.

TABLE 2B

POWDER COMPOSITIONS AND PROPERTIES
FOR UF AND DF TREATED MILKS, 30K MEMBRANES

| | Treatment | | | | | | | Powder Properties | | | |
|---|---|---|---|---|---|---|---|---|---|---|---|
| | | | Temperature | Powder Composition | | | | Solubility % @ | Solubility % @ | Viscosity | Flavor |
| | Alkali | pH | (° C.) | Protein % | Lactose % | Ash % | Calcium % | 20° C. | 60° C. | (@ 15% solids) | Score |
| A | Na | 7.5 | 75 | 89.3 | 0.6 | 7.2 | 2.2 | 60 | 99 | 100 | 17 | 6.4 |
| B | Na | 7.5 | 85 | 90.7 | 0.4 | 7.0 | 2.2 | 45 | 82 | 90 | 44 | 6.0 |
| C | Na | 8.5 | 65 | 90.3 | 0.5 | 7.1 | 2.1 | 60 | 92 | 99 | 30 | 6.6 |
| D | Na | 8.5 | 75 | 89.2 | 0.5 | 7.3 | 2.2 | 45 | 92 | 99 | 33 | 7.0 |
| E | Na | 8.5 | 85 | 88.6 | 0.3 | 7.5 | 2.2 | 75 | 77 | 100 | 21 | 6.1 |
| F | Na | 9.5 | 65 | 90.1 | 0.1 | 6.7 | 2.3 | 60 | 79 | 90 | 36 | 6.3 |
| G | Na | 9.5 | 65 | 90 | 0.1 | 6.8 | 2.3 | 60 | 80 | 93 | 51 | 6.6 |
| H | Na | 9.5 | 85 | 89.4 | 0.5 | 7.7 | 2.4 | 120 | 95 | 82 | 133 | 5.9 |
| I | — | — | | 6.8 | 89.3 | 0.3 | 6.7 | 2 | 45 | 74 | 93 | 12 | 5.9 |
| J | — | — | | 6.8 | 90.1 | 0.1 | 6.5 | 2.1 | 75 | 78 | 98 | 11 | 6.4 | nd = not determined by assay.

TABLE 2A

MILK TREATMENT AND PROCESS VARIABLES

| | Membrane[a] | Alkali[b] | pH[c] | Temperature[d] | Acid[e] | pH[f] | Total VCF[g] |
|---|---|---|---|---|---|---|---|
| A | 30K | Na | 7.5 | 75 | $SO_4$ | 6.8 | 380 |
| B | 30K | Na | 7.5 | 85 | $SO_4$ | 6.8 | 380 |
| C | 30K | Na | 8.5 | 65 | $SO_4$ | 6.8 | 370 |
| D | 30K | Na | 8.5 | 75 | $SO_4$ | 6.8 | 360 |
| E | 30K | Na | 8.5 | 85 | $SO_4$ | 6.8 | 460 |
| F | 30K | Na | 9.5 | 65 | $SO_4$ | 6.8 | 380 |
| G | 30K | Na | 9.5 | 65 | $SO_4$ | 6.8 | 380 |
| H | 30K | Na | 9.5 | 85 | $SO_4$ | 6.8 | 400 |
| I | 30K | None | NA | NA | None | NA | 390 |
| J | 30K | None | NA | NA | None | NA | 390 |

[a]Membrane molecular weight cut-off 30K = 30,000
[b]Type of alkali used to raise the milk pH Na = NaOH, Ca = $Ca(OH)_2$
[c]pH after alkali addition at 25° C.
[d]Temperature to which the alkalized milk was raised and held for 5 minutes
[e]Type of acid used to lower the pH, $SO_4$ = sulfuric acid, Citric = citric acid, $PO_4$ = phosphoric acid
[f]pH after acid addition and before UF and DF
[g]Total effective Volume Concentration Factor after UF and DF and before drying Evaluation of the composition and properties of both the resulting powder and the permeates for the effects of the pH treatment and the temperature treatment shows that: concentrates prepared from milk treated at a high pH are more viscous, less heat stable, harder to disperse and less soluble than the concentrate prepared from milk treated at pH 7.5 or 8.5; concentrates made from a high temperature treatment of the milk were also more viscous and less readily soluble than concentrates made from milk treated at lower temperature; concentrates from milk treated at pH 8.5 and at moderate temperature (65 and 75° C.) had the best flavor score, were easy to disperse and were the most soluble at 20° C., but other treatment conditions may be selected based on the desired attributes of the ingredient.

Example 3

344 pounds (40 gallons) of pasteurized, nonfat fluid milk was adjusted from the natural pH of milk (approximately pH 6.5) to pH 7.5 by the addition of 2.7 pounds of 2N sodium hydroxide. The temperature of the mix was then increased to 85° C., and the fluid held at that temperature for five minutes. The vessel and the fluid were then cooled to 25° C. by the addition of 24 pounds of ice and the application of cooling water circulated through the vessel jacket. The pH of the mix was then adjusted to 6.8 by the addition of 1.9 pounds of 0.5M sulfuric acid while vigorously agitating the fluid. The temperature of the approximately 360 pounds of fluid was further reduced to approximately 15° C. and the treated milk processed by ultrafiltration in a Niro Ultrafiltration Pilot Plant model PA660A equipped with PES spiral wound membranes with a molecular weight cut-off of 70,000 from Snyder Filtration. By ultrafiltration, the weight (or volume) was reduced to one-third of the original weight accompanied by collection of 240 pounds of permeate.

Following the three-fold reduction in the fluid volume, diafiltration was started by adding a total of approximately 420 pounds of deionized water to the retentate at the same rate that permeate was removed so as to maintain a constant volume of retentate. Following the diafiltration process, the retentate was concentrated by an ultrafiltration process which reduced the volume (or weight) by another factor of two. The final retentate was then collected by draining the membrane module and flushing the module with deionized water. This composition was then spray dried to produce a powdered ingredient.

Table 3A shows more details of the volume and milk component concentration measurements made during the processing of Example 3, and this table includes data on the processing of untreated skim milk in the same membrane module.

TABLE 3A

PRETREATMENT, PROCESSING, AND YIELD
COMPARED TO AN UNTREATED CONTROL MILK

|  | Example 1 | Control |
|---|---|---|
| Milk (gallons) | 40 | 40 |
| (pounds) | 344 | 344 |
| 2N NaOH (pounds) | 3 | 1 |
| Alkaline pH | 7.5 | — |
| Temperature | 87° C. | — |
| Time (minutes) | 5 | — |
| 0.5M $H_2SO_4$ (pounds) | 2 | — |
| Final pH | 6.8 | 6.8 |
| UF permeate (pounds) | 240 | 240 |
| UF retentate (pounds) | 120 | 120 |
| DF permeate (pounds) | 420 | 420 |
| DF diluent (pounds) | 420 | 420 |
| UF VCF | 3 | 3 |
| DF equivalent VCF | 33 | 33 |
| Second UF VCF | 2 | 2 |
| Total equivalent VCF | 200 | 200 |
| Retentate protein (grams) | 5600 | 5320 |
| UF permeate protein (grams) | 210 | 380 |
| Retentate protein yield (%) | 96 | 93 |

Figure 3:
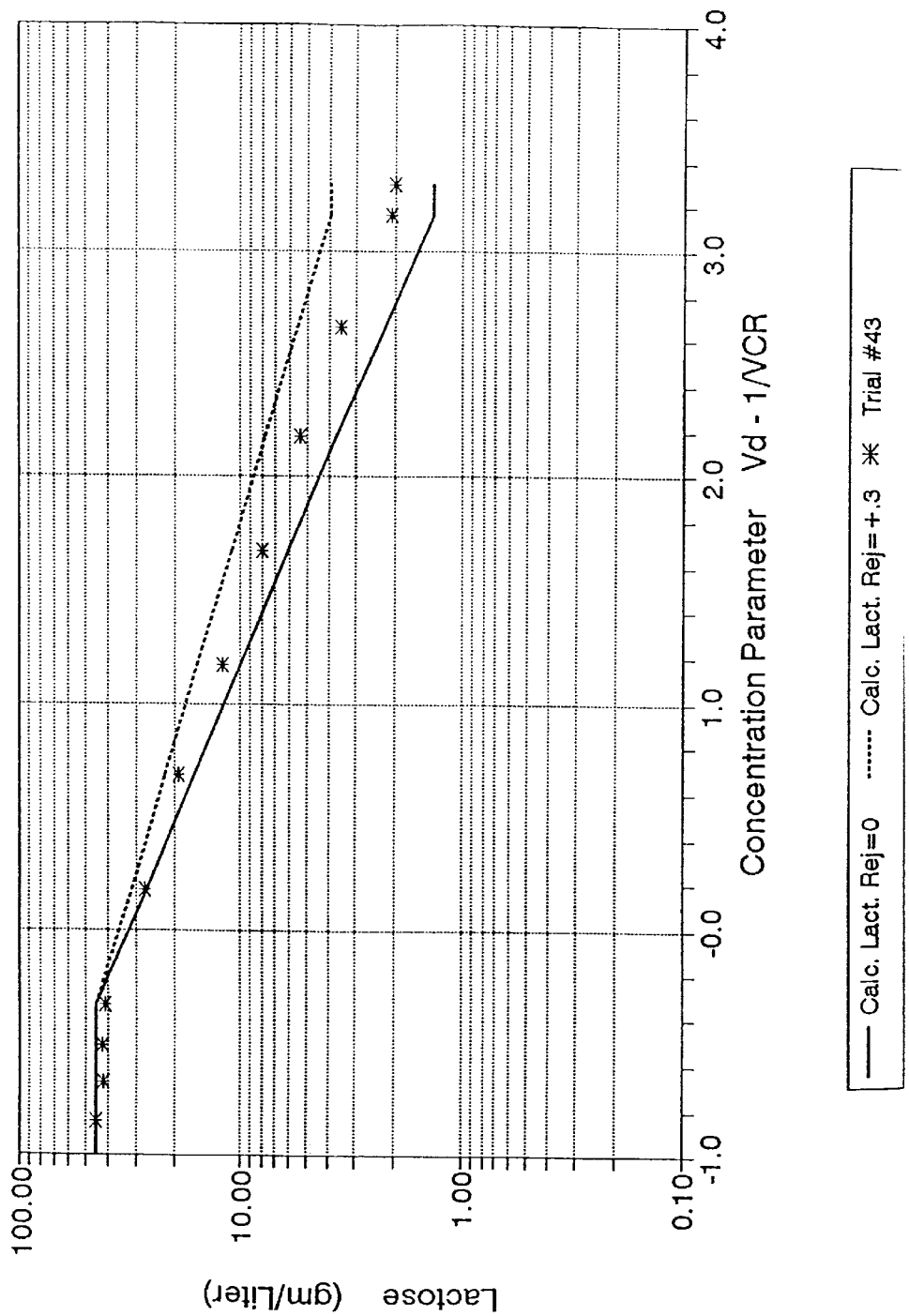
FIG. 3 is a plot of lactose content of the retentate plotted against the calculated Volume Parameter described by Rajagopalan and Cheryan, J. Dairy Sci., 74, 2435–2439, 1991). Data are from Example 3 where the milk, prior to UF and DF was treated by raising the pH to 7.5, heating to 87 degrees C., cooling, and lowering the pH to 6.8 with sulfuric acid. UF and DF on a 70,000 MWCO membrane. Two theoretical lines were calculated from the initial lactose content, the Concentration Parameter, and assuming a rejection coefficient for lactose of either 0 (solid line) or 0.3 (broken line).
Figure 4:
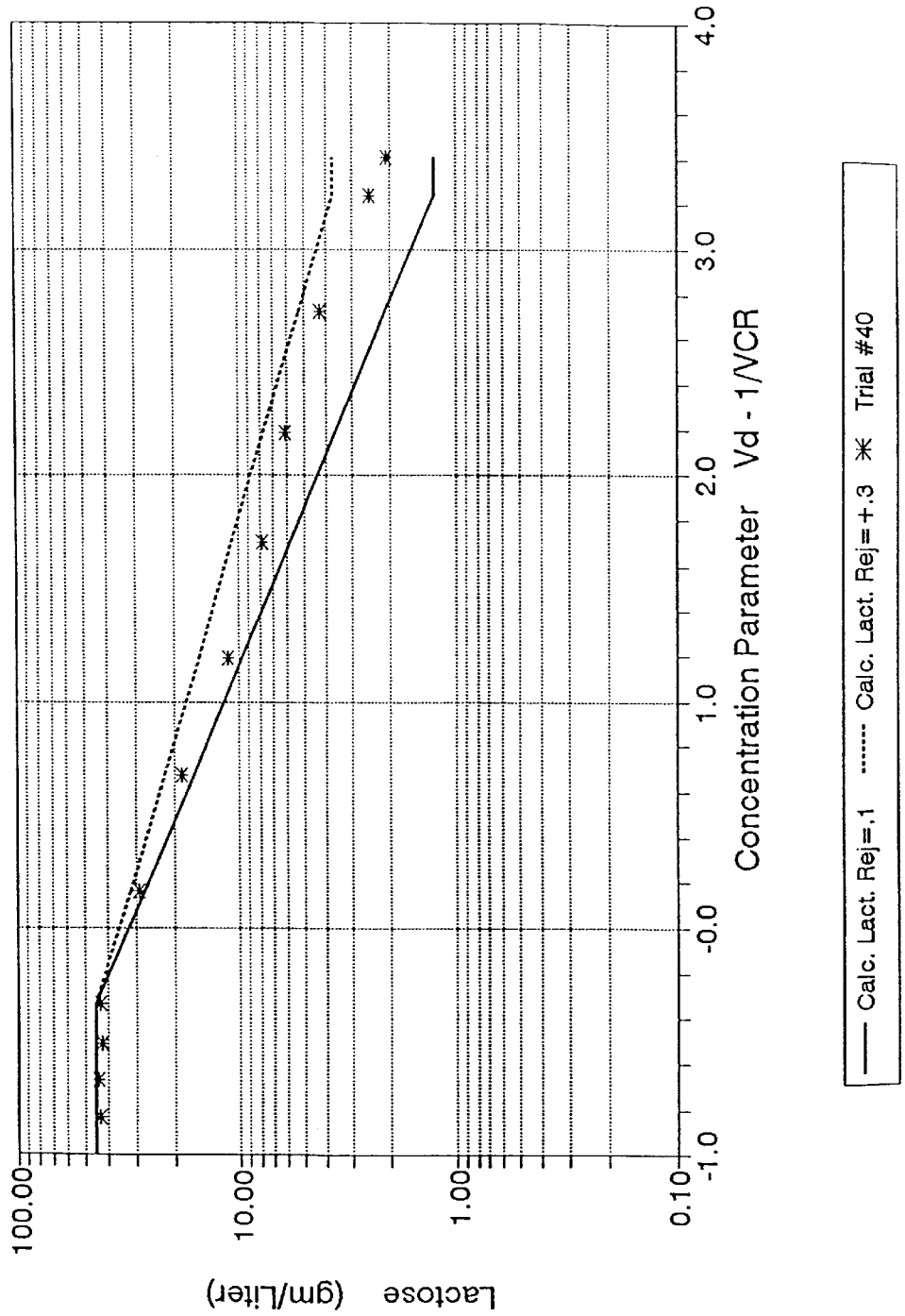
FIG. 4 is a plot of lactose content of the retentate plotted against the calculated Volume Parameter described by Rajagopalan and Cheryan, J. Dairy Sci., 74, 2435–2439, 1991). Data are from untreated milk processed on the 70,000 MWCO membrane, like Example 3. Two theoretical lines were calculated from the initial lactose content, the Concentration Parameter, and assuming a rejection coefficient for lactose of either 0 (solid line) or 0.3 (broken line).

Removal of lactose from the retentate of milk treated by this invention is shown in FIG. 3 and removal of lactose from untreated skim milk using the same membrane filtration technique is shown in FIG. 4. The data in each figure are accompanied by two theoretical lines for lactose removal by membrane filtration calculated from equations adopted from Rajagopalan and Cheryan (see methods above). The theoretical lactose concentration in the retentate is dependent on the UF and DF volume measurement and also on an assumed rejection coefficient for lactose. Rejection coefficients generally range from zero to one with a value of zero assigned to components that pass through the membrane unaffected by the membrane properties and a value of one assigned to large components which do not pass through the membrane at all. For the treated milk of this invention, the rejection coefficient for lactose (see FIG. 3) appears to be approximately zero, that is, the removal of lactose from the retentate is not inhibited by the membrane or by coating of the membrane by the proteins of the retentate. Within experimental error, the rejection coefficient for lactose for the untreated milk (FIG. 4) is also about zero.

The composition, functional properties, and flavor scores for the powder produced by the Example 3 process and the powder produced from untreated skim milk are shown in Table 3B.

TABLE 3B

POWDER COMPOSITION AND PROPERTIES
FOR UF AND DF TREATED AND UNTREATED MILKS, 70K MEMBRANES

| Treatment | | | Powder Composition | | | | Powder Properties | | | | |
|---|---|---|---|---|---|---|---|---|---|---|---|
| Alkali | pH | Temperature (° C.) | Protein % | Lactose % | Ash % | Calcium % | Dispersibility (sec) | Solubility % @ 20° C. | Solubility % @ 60° C. | Viscosity (cP) (@ 15% solids) | Flavor Score |
| Na | 7.5 | 85 | 88.3 | 1.4 | 7.6 | 2.3 | 45 | 94 | 95 | 104 | 5.8 |
| — | 6.8 | — | 88.0 | 1.1 | 6.5 | 2.4 | 30 | 80 | 97 | 16 | 6.1 |

Compared to the product resulting from untreated skim milk, the product made by the present invention has approximately the same composition, but lower lactose, and, as in Example 1, has the unexpected advantages of a more rapid cold water solubility and a higher viscosity when dissolved in water. The higher viscosity is an advantage in providing "body" and an improved, less watery mouth feel to liquids.

Example 4

Forty (40) gallon samples of pasteurized skim milk were individually treated by the sequence of processing steps described in Example 3 and using the alkali, temperature, and acid treatments described in Table 4A.

TABLE 4A

MILK TREATMENT AND PROCESS VARIABLES

| | Membrane[a] | Alkali[b] | pH[c] | Temperature[d] | Acid[e] | pH[f] | Total VCF[g] |
|---|---|---|---|---|---|---|---|
| A | 70K | NaOH | 7.5 | 87 | $SO_4$ | 6.8 | 200 |
| B | 70K | NaOH | 8.5 | 65 | $SO_4$ | 6.8 | 200 |
| C | 70K | NaOH | 8.5 | 75 | $SO_4$ | 6.8 | 200 |
| D | 70K | NaOH | 8.5 | 85 | $SO_4$ | 6.8 | 200 |
| E | 70K | NaOH | 9.5 | 65 | $SO_4$ | 6.8 | 200 |
| F | 70K | NaOH | 9.5 | 87 | $SO_4$ | 6.8 | 200 |

TABLE 4A-continued

MILK TREATMENT AND PROCESS VARIABLES

| | Membrane[a] | Alkali[b] | pH[c] | Temperature[d] | Acid[e] | pH[f] | Total VCF[g] |
|---|---|---|---|---|---|---|---|
| G | 70K | NaOH | 6.8 | 87 | NA | NA | 200 |
| H | 70K | | 6.8 | NA | NA | NA | 200 |

[a]Membrane molecular weight cut-off 30K = 30,000
[b]Type of alkali used to raise the milk pH Na = NaOH, Ca = Ca(OH)$_2$
[c]pH after alkali addition at 25° C.
[d]Temperature to which the alkalized milk was raised and held for 5 minutes
[e]Type of acid used to lower the pH, SO$_4$ = sulfuric acid, Citric = citric acid, PO$_4$ = phosphoric acid
[f]pH after acid addition and before UF and DF
[g]Total Volume Concentration Factor after UF and DF and before drying The treated milks were ultrafiltered and diafiltered in the same fashion as described in Example 3. All of the treated milks (Table 4A, samples A through G) and the untreated skim milk in this example (Table 4A, sample H) were processed using a 70,000 molecular weight cut-off, spiral wound membrane module. The membrane module was cleaned by flushing the module with caustic, water, acid, water, alkaline protease, and water. Samples were taken as in Examples 1 through 3 during the UF and DF processing, and a sample of the powdered product from spray drying each of the retentates was also taken for analysis. The compositions, solubility, heat stability, viscosity, and flavor evaluation for samples from the treated milks and the untreated samples of this example are shown in Table 4B.

Evaluation of the composition and properties of the spray dried, retentate powders for the effects of the pH treatment and the temperature treatment applied to the milk prior to UF and DF is shown in Table 4B.

since these applications, as well as others, require that the ingredients are fully soluble, functional, and visually attractive.

From Table 4B, it is also apparent that the viscosity of 15% solutions of the retentate powders could be altered in comparison to the viscosity of the control powder. The viscosity of the resulting 15% powder solution (prepared hot and cooled to 25° C.) increased with increases in both the pH and the temperature of the alkali treatment. Surprisingly, some conditions for pretreatment of the milk resulted in powders that could be used for very high viscosity applications. The improved, highly viscous ingredients of this invention can be utilized to impart "body" or "less watery" mouthfeel to liquid and semi-solids, and can be utilized in high moisture and lowfat food applications.

The trained panel flavor scores were highest for retentates prepared from low temperature treatments at all of the alkaline pHs shown in Table 4B. The flavor scores for the retentates from alkali treatment at pH 8.5 and 9.5 show an improvement over the flavor score of the retentate from untreated standard milk. It should be noted that the flavor score for the powder from untreated milk is already high (value is 6.1, maximum score is 7.0) and any improvement will allow the ingredients to be utilized in flavor-sensitive applications and in applications where a high protein content is required.

Example 5

Forty (40) gallon samples of pasteurized skim milk were individually treated by the sequence of processing steps described in Example 1 and using the alkali, temperature, and acid treatments described in Table 5A.

TABLE 4B

POWDER COMPOSITION AND PROPERTIES FOR UF AND DF TREATED MILKS, 70K MEMBRANES

| | Treatment | | | Powder Composition | | | | Powder Properties | | | | |
|---|---|---|---|---|---|---|---|---|---|---|---|---|
| | Alkali | pH | Temperature (° C.) | Protein % (db) | Lactose % | Ash % | Calcium % | Dispersibility (sec) | Solubility % @ 20° C. | Solubility % @ 60° C. | Viscosity (@ 15% solids) | Flavor Score |
| A | Na | 7.5 | 85 | 88.3 | 1.4 | 7.6 | 2.3 | 45 | 94 | 95 | 104 | 5.8 |
| B | Na | 8.5 | 65 | | 1.0 | 8.0 | 2.3 | 45 | 93 | 94 | 46 | 6.6 |
| C | Na | 8.5 | 75 | 88.2 | 1.4 | 7.1 | 2.2 | 45 | 98 | 96 | 31 | 6.4 |
| D | Na | 8.5 | 85 | 86.3 | 0.9 | 7.7 | 2.5 | 120 | 100 | 98 | 155,000 | 6.4 |
| E | Na | 9.5 | 65 | 89.3 | 1.3 | 7.0 | 2.1 | 45 | 93 | 99 | 18 | 6.5 |
| F | Na | 9.5 | 87 | 85.2 | 1.2 | 7.9 | 2.6 | 120 | 94 | 94 | gelled | 5.5 |
| G | Na | 6.8 | 87 | 87.8 | 0.9 | 9.1 | 2.5 | 120 | 80 | 89 | 190,000 | 6.1 |
| H | — | 6.8 | — | 88.0 | 1.1 | 6.5 | 2.4 | 30 | 80 | 97 | 16 | 6.1 |

All of the powders in this example have high protein, low lactose, and high calcium contents. The powders from milk treated with alkali at the lowest temperature (65° C.) dispersed easily into water at about the same rate as the control powder (sample H) made without alkali or temperature pretreatment. The cold water solubility (percent soluble at 20° C.) for all of the powders from alkali treated milk was improved over the cold water solubility of the control. This improvement in solubility will provide for improved utility of the retentate powder from this invention in dry powder nutritional drink mixes and for use in fortifying cheese milk,

TABLE 5A

| | Membrane | Alkali | pH | Temp (° C.) | Acid | pH | Total VCF |
|---|---|---|---|---|---|---|---|
| A | 30K | NaOH | 7.5 | 85 | citric | 6.8 | 380 |
| B | 30K | Ca(OH)$_2$ | 7.5 | 85 | sulfuric | 6.8 | 380 |
| C | 30K | Ca(OH)$_2$ | 8.5 | 75 | phosphoric | 6.8 | 360 |
| D | 30K | Ca(OH)$_2$ | 8.5 | 75 | phosphoric | 6.8 | 120 |
| E | 70K | Ca(OH)$_2$ | 8.5 | 75 | phosphoric | 6.8 | 140 |
| F | 70K | Ca(OH)$_2$ | 8.5 | 75 | Na phosphate & phosphoric | 6.8 | 200 |

TABLE 5A-continued

| Membrane | Alkali | pH | Temp (° C.) | Acid | pH | Total VCF |
|---|---|---|---|---|---|---|
| G | 70K | Ca(OH)$_2$ | 9.5 | 65 | phosphoric | 6.8 | 200 |
| H | 70K | NaOH | 9.5 | 75 | citric | 6.2 | 200 |

The treated milks were ultrafiltered and diafiltered in the same fashion as described in Example 1. The treated milks of Table 5A were processed using either a 30,000 or a 70,000 molecular weight cut-off, spiral wound membrane module as designated in Table 5A. The membrane module was thoroughly cleaned between each sample that was processed by flushing the module with caustic, water, acid, water, alkaline protease, and water. Samples of the powdered product from spray drying each of the retentate samples were taken for analysis. The compositions, solubility, heat stability, viscosity at 15% solids, and flavor evaluations are shown in Table 5B.

The calcium level of the retentate can be adjusted to a level lower than that of the retentate of the control, untreated milk by using citric acid as the pH lowering agent (examples 5A and 5H), or by lowering the pH below the natural pH of milk in order to solubilize the natural calcium component of the retentate (example 5H). This invention thus results in being able to adjust the calcium content of the retained high protein ingredient in a manner and to an extent not otherwise provided by current art.

The powders resulting from spray drying retentates after pH adjustment with calcium hydroxide appear, in comparison to comparable powders produced using sodium hydroxide, to be more readily dispersible into water, to be less soluble in water at both 20° C. and 60° C., to be less heat stable, and to make solutions which are less viscous. The flavor scores of the retentates from calcium hydroxide treated skim milk are reduced in comparison to flavor scores of the retentates from sodium hydroxide treated milk principally due to having a slightly more chalky mouthfeel.

TABLE 5B

POWDER COMPOSITION AND PROPERTIES
FOR UF AND DF TREATED MILKS, 30K MEMBRANES

| | Treatment | | | Powder Composition | | | | Powder Properties | | | | |
|---|---|---|---|---|---|---|---|---|---|---|---|---|
| | Membrane | Alkali | pH | Temperature (° C.) | Protein % | Lactose % | Ash % | Calcium % | Dispersibility (sec) | Solubility % @ 20° C. | Solubility % @ 60° C. | Viscosity (cP) | Flavor Score |
| A | 30 | Na | 7.5 | 85 | 91 | 0.4 | 7.0 | 2.2 | 45 | 82 | 90 | 44 | 6.0 |
| B | 30 | Ca | 7.5 | 85 | 88 | 0.3 | 8.6 | 3 | 30 | 75 | 90 | 17 | 6.0 |
| C | 30 | Ca | 8.5 | 75 | 84 | 0.4 | 9.5 | 3.3 | 30 | 68 | 83 | 15 | 5.8 |
| D | 30 | Ca | 8.5 | 75 | 87 | 0.7 | 9.5 | 3.3 | 45 | 85 | 87 | 15 | 5.9 |
| E | 70 | Ca | 8.5 | 75 | 84 | 1.3 | 9.9 | 3.4 | 45 | 37 | 91 | 12 | 5.5 |
| F | 70 | Ca | 8.5 | 75 | 86 | 0.9 | 9.6 | 3.5 | 30 | 53 | 91 | 19 | 6.4 |
| G | 70 | Ca | 9.5 | 65 | 84 | 0.9 | 11.8 | 3.6 | 30 | 49 | 75 | 11 | 5.9 |
| H | 70 | Na | 9.5 | 75 | 91 | 1.2 | 6.8 | 2.2 | 75 | 91 | 92 | 42 | 6.4 |

Also, see Tables 2A, 2B, 4A, and 4B for the analysis of untreated milk and for some of the below mentioned comparisons of the properties from this example.

The use of calcium hydroxide as the alkaline agent for pH increase results in an increase in the calcium content of the retentate in proportion to the amount of calcium hydroxide used for the pH increase. A significant portion of the calcium used to adjust the pH upwards has been recovered in the retentate from each of the calcium hydroxide treated milks. From calcium recovery calculations, virtually all of the 56 grams of calcium (used as calcium hydroxide) added in adjusting the pH to 7.5 was recovered in the retentate of example 5B. Approximately 70% of the 90 grams of calcium (added as calcium hydroxide) used to adjust the pH to 8.5 or 9.5 was recovered in the retentates of examples 5C and 5G. The calcium added to the milk for the pH adjustment in the improved ingredients is advantageously retained due either to binding to the protein or due to being made insoluble from adding either sulfuric or phosphoric acid during the pretreatment of milk before membrane processing.

Example 6

Pasteurized fluid skim milk was concentrated two-fold by ultrafiltration using a 30,000 molecular weight cut-off membrane module. The concentrate contains about 50% of the original lactose and almost all of the original protein in one-half of the original volume. The concentrate pH was adjusted from the original pH 6.6 to pH 8.5 using 2N sodium hydroxide. The temperature of the mix was then increased to 75° C., and the fluid held at that temperature for more than five minutes, after which the temperature was adjusted back to 25° C. The pH of this alkali and heat treated mix was then adjusted to pH 6.8 by the addition of 0.5M sulfuric acid while vigorously agitating the fluid. The temperature was further reduced to approximately 15° C. and the treated concentrate processed by a combination of ultrafiltration and diafiltration using PES spiral wound membranes with a molecular weight cut-off of 70,000. The membrane processing was completed at an equivalent VCF of 220. The final retentate was spray dried to a powder, and the powder was analyzed as described in the examples above.

TABLE 6

POWDER COMPOSITION AND PROPERTIES FOR UF AND DF TREATED MILK, 70K MEMBRANES

| Treatment | | | Powder Composition | | | | Powder Properties | | | | |
| --- | --- | --- | --- | --- | --- | --- | --- | --- | --- | --- | --- |
| Alkali | pH | Temperature (° C.) | Protein % (db) | Lactose % | Ash % | Calcium % | Dispersibility (sec) | Solubility % @ 20° C. | Solubility % @ 60° C. | Viscosity (cP) | Flavor Score |
| Na | 8.5 | 75 | 89.0 | 1.1 | nd | nd | 45 | 90 | 100 | 191 | 6.7 |

Table 6 summarizes the composition and the physical properties of the powdered retentate. This example is similar to example 4C regarding the alkali and heat treatment, but differs from 4C in the sequence of UF and pH adjustment. In 4C, the milk was alkali-heat treated before UF, and here, the milk was first concentrated two-fold before the alkali-heat treatment. The retentate of this example can also be compared to the retentate from untreated, standard milk, Example 4H. The dispersability of the three samples is about the same, but the viscosity of a 15% suspension of Example 6 and Example 4C is higher than the viscosity of the retentate from standard milk. The cold water solubility and the flavor score for Example 6 is also improved over the properties of the retentate from untreated milk, as is the retentate from Example 4C. Minor adjustments to the retentate protein properties are possible from careful selection of the processing sequence as well as the conditions for alkali and heat treatments and the selection of the membrane. Process economics may favor the pre-concentration of the milk by membrane or evaporative processing benefits can be continued through use of this invention.

Example 7

Pasteurized skim milk was processed in a continuous system for alkali addition, heat treatment, cooling, neutralization with acid, ultrafiltration, and diafiltration. One alkali-heat treatment of the invention (7A) was adjusted to pH 7.5 with sodium hydroxide, heating to 85° C., cooling to 25° C., and neutralization to pH 6.8 with sulfuric acid. Another alkali-heat treatment (7B) was adjustment to pH 9.5 with sodium hydroxide, heating to 65° C., cooling to 25° C., and neutralization to pH 6.8 with sulfuric acid. In a third trial (7C), untreated skim milk was processed in the continuous UF and DF module. In all cases, the UF and DF module utilized 10,000 molecular weight cut-off membranes and the milks were membrane processed to give retentates with the retrials having less than 2% lactose.

Properties of the three retentates are shown in Table 7.

TABLE 7

POWDER COMPOSITION AND PROPERTIES FOR UF AND DF TREATED MILKS, 10K MEMBRANES

| | Treatment | | | Powder Composition | | | | Powder Properties | | | | | |
| --- | --- | --- | --- | --- | --- | --- | --- | --- | --- | --- | --- | --- | --- |
| | Alkali | pH | Temperature (° C.) | Protein % (db) | Lactose % | Ash % | Calcium % | Dispersibility (seconds) | Solubility % @ 20° C. | Solubility % @ 60° C. | Heat Stability (retorted) | Viscosity (@ 15% solids) | Flavor Score |
| A | Na | 7.5 | 85 | 89.8 | 1.2 | 7.5 | 2.4 | 45 | 97 | 100 | 97 | 22 | NA |
| B | Na | 9.5 | 65 | 88.7 | 1.7 | 7.7 | 2.4 | 60 | 97 | 90 | 95 | 26 | 6.3 |
| C | — | 6.6 | — | 90.1 | 1.7 | 7.2 | 2.3 | 60 | 83 | 96 | 90 | 13 | 6.3 |

Example 8

To 40 gallons of skim milk, having about 5,500 grams of protein, was added 1.6 kilograms of powdered whey protein concentrate having about 1,200 grams of protein. The fluid was adjusted to pH 7.5 with sodium hydroxide, heated to 65° C., held for 15 minutes, cooled to 25° C., and adjusted to pH 6.4 using citric acid. The treated mix was cooled to 15° C. and processed by UF and DF to a combined equivalent VCF of about 400 using a 30,000 molecular weight cut-off membrane module.

Properties of the retentate powder from Example 8 are shown in Table 8. Use of citric acid for pH adjustment and UF and DF at pH 6.4 resulted in a low calcium powder compared to the control, untreated milk of example 21 and 2J.

TABLE 8

POWDER COMPOSITION AND PROPERTIES
FOR UF AND DF TREATED MILK, 70K MEMBRANES

| | Treatment | | | Powder Composition | | | | Powder Properties | | | | | |
|---|---|---|---|---|---|---|---|---|---|---|---|---|---|
| | Alkali | pH | Temperature (° C.) | Protein % (db) | Lactose % | Ash % | Calcium % | Dispersibility (seconds) | Solubility % @ 20° C. | Solubility % @ 60° C. | Heat Stability (retorted) | Viscosity (@ 15% solids) | Flavor Score |
| A* | Na | 7.5 | 65 | 90.3 | 0.4 | 5.9 | 1.8 | 120 | 90 | 96 | na | 11 | 5.6 |

* pH prior to UF and DF was 6.4 adjusted using citric acid. Starting fluid was milk
* with added whey protein.

It is estimated that approximately 95% of the added whey protein remains in the UF, DF retentate. Because of the high level of amino acids essential to human growth and maintenance, this retentate complex with its good flavor and high solubility should be an excellent ingredient for nutritional supplementation.

Example 9

Samples of milk were treated by the conditions outlined in Table 9 and then membrane filtered by a combined UF and DF process using the membranes and the equivalent VCF reported in Table 9. The composition and notable physical or functional properties are also reported in Table 9.

opaque (white) than the others. The least opaque were 9G, 9J, and 9L. The low opacity retentates were from milk pretreated at high pH or retentates collected during UF of slightly acidic milk. The opacity was restored by neutralizing the low pH retentate with calcium hydroxide (sample 9E). Unexpectedly, this sample also had the highest cold water solubility of this group; 100% soluble at 25° C. This product of the invention has attractive features as an ingredient for nutritional foods and other applications where a functional milk protein is needed.

Example 10

Skim milk, with a lactose content of about 60% of the solids, was treated by a combined UF and DF membrane

TABLE 9

ALKALI, HEAT, AND ACID TREATMENT OF MILK
BEFORE OR DURING MEMBRANE FILTRATION

| | Membrane | Treatment | | | | | Final | Equivalent | Powder Composition | | | | |
|---|---|---|---|---|---|---|---|---|---|---|---|---|---|
| | MWCO | Alkali | pH | Temperature (° C.) | Acid | | pH | VCF | Protein % | Lactose % | Ash % | Calcium % | Sodium % |
| A | 10K | — | — | — | — | | 6.6 | 180 | 88 | 0.1 | 6.7 | 2.3 | 0.1 |
| B | 10K | Na | 8.2 | 80 | sulfuric | | 6.8 | 200 | 88 | 0.1 | 7.3 | 2.5 | 0.1 |
| C | 10K | Na | 9.5 | 75 | sulfuric | | 6.8 | 200 | 88 | 0.1 | 7.2 | 2.3 | 0.2 |
| D | 30K | — | — | — | — | | 6.8 | 180 | 87 | 06 | 6.7 | 2.3 | 0.1 |
| E | 30K | — | — | — | citric* | | 5.5 | 140 | 90 | 1.2 | 3.8 | 1.4 | 0.1 |
| F | 30K | Na | 8.2 | 80 | citric | | 6.8 | 180 | 88 | 0.5 | 4.7 | 0.6 | 0.1 |
| G | 30K | Na | 9.5 | 75 | sulfuric | | 68 | 450 | 86 | 0.2 | 7.0 | 2.4 | 0.1 |
| H | 30K | Na | 9.5 | 75 | citric | | 6.8 | 180 | 89 | 0.9 | 5.9 | 1.9 | 0.2 |
| I | 100K | — | — | — | — | | 6.6 | 180 | 88 | 0.1 | 6.7 | 2.3 | 0.1 |
| J | 100K | Na | 8.2 | 80 | citric | | 8** | 110 | 85 | 1.6 | 8.3 | 2.3 | 0.2 |
| K | 100K | Na | 9.5 | 75 | citric | | | 200 | 89 | 0.7 | 6.2 | 2.0 | 0.2 |
| L | 100K | Na | 9.5 | 75 | citric | | 5.5 | 200 | 92 | 1.0 | 2.7 | 0.4 | 0.1 |

*Citric acid and UF at pH 5.5, Ca(OH)₂ added before drying, pH 7
**5 grams of citric acid per liter of DF diluent.

A very low calcium retentate was processed by using a citrate salt in the DF diluent to continuously solubilize native milk calcium for removal to the permeate. Membranes with 10,000, 30,000, and 100,000 molecular weight cut-offs could be used to give high yields of protein and calcium in the retentates.

Observations on Example 9 Retentate Samples

Some very low calcium variations (9F and 9L) were prepared by UF and DF at low pH and in the presence of calcium complexing citrate ions. These appear to have the highest viscosity and should function like sodium caseinate in processed foods.

When dissolved in water, the most opaque white retentates were 9E, 9K, 9B, and 9A with 9E and 9K being more filtration process to reduce the lactose to less than about 1% to 2% of the solids and this was used as the starting material for the process of this invention. The concentrate contained about 1% of the original lactose and almost all of the original protein in one-third to one-fourth of the original volume. It is not necessary to concentrate the milk proteins in the retentate, relative to total solids, to any specific level, the level of concentration being dependent on the desired composition of this retentate and the intended use of the liquid or subsequently dried milk protein concentrate. The pH of the concentrate was adjusted from the original pH 6.6 to pH 7.5 using 2N sodium hydroxide. The temperature of the mix was then increased to 85° C., and the fluid held at that temperature for more than five minutes, after which the temperature was adjusted back to 25° C. The pH of this alkali and heat treated mix was then adjusted to pH 6.8 by the addition of 0.5M sulfuric acid while vigorously agitating the fluid. No further membrane processing was undertaken. The composition was spray dried to a powder and evaluated for performance characteristics.

The dried product from the alkali treatment of the invention had a cold water solubility of 88% compared to 80% cold water solubility for the dried UF and DF processed control untreated standard milk. The viscosity of 15% solids was 20 Centipose, or about the same as that of the dried UF and DF processed control untreated standard milk (see Example 4H, Table 4). The properties of this example compare beneficially to those of the product of current art. The product of the invention disperses easily in water (30 seconds for 95% of 5 grams of powder to be evenly distributed as a water solution or suspension in 95 grams of stirred water at 25° C.) and water solutions of the product were opaque white. The product of this example is comparable to the product of Example 4A where the starting material was ordinary milk and the UF and DF processing was performed after the alkali treatment of the invention. The raw material for the alkali treatment of the invention can be milk or milk that has been concentrated, and the product of the invention can be dried for use as an ingredient, or the product can be used as a liquid. Alternatively, the product of the invention may be concentrated and dried as an ingredient or it may be concentrated and used as a liquid without loss of the benefits of the invention.

Protein Content in UF and DF Permeates

The typical content of alpha-lactalbumin in milk is approximately 0.6 to 1.7 grams per liter, or on the average approximately 1.2 grams per liter. Also, the typical content of beta-lactoglobulin is approximately 3.0 grams per liter. Forty (40) gallons should contain approximately 180 grams of alpha-lactalbumin and 450 grams of beta-lactoglobulin. Analysis of the 240 pounds of UF permeate from Examples 3 and 4 using a 70,000 molecular weight cut-off membrane shows approximately 40 grams of alpha-lactalbumin and 40 grams of beta-lactoglobulin in each of the UF permeates. Table 10 shows the concentrations and proportion of the protein in the permeate represented by alpha-lactalbumin and beta-lactoglobulin for a variety of milk pretreatments and three types of membrane. The concentration of these two proteins in the permeate was dependent upon both the alkali and heat pretreatment of the milk and on the membrane used for UF and DF processing. The permeate proteins are shown in Table 10 for both the ultrafiltration permeate, that is the permeate collected during the initial three-fold concentration step, and the diafiltration permeate, that is permeate collected after concentration and during membrane processing at a constant volume of retentate. Selection of the alkali, temperature, and membrane can be used to produce one or more permeates, with a unique, and surprisingly high proportional content of alpha-lactalbumin compared to the proportion in milk and compared to the proportion in permeate from the untreated milk samples, A, C, and L. For instance, when the milk is treated at the higher temperatures (75° C. or 85° C.), regardless of the pH, one obtains an ultrafiltration or diafiltration permeate with a much higher level of alpha-lactalbumin as a percent of the total protein in the permeate in comparison to the permeate proteins from untreated and unheated skim milk.

TABLE 10

UF AND DF PERMEATE PROTEIN COMPOSITION
DEPENDENCE OF MILK TREATMENT

| | Milk Process Conditions | | | | Permeate Protein | | | |
| | | | | | Grams/liter | | | |
| Reference | | pH | Temperature (° C.) | Membrane Process | Total | A Alpha-lactalbumin | B Beta-lactoglobulin | % (A + B)/T |
| --- | --- | --- | --- | --- | --- | --- | --- | --- |
| A | | 6.8 | 25 | UF 10 | 2.20 | 0.71 | 0.76 | 0.67 |
| | | | | DF 10 | 2.65 | 0.44 | 0.53 | 0.32 |
| B | | 6.8 | 87 | UF 10 | 2.14 | 0.77 | 0.72 | 0.69 |
| | | | | DF 10 | 1.71 | 0.33 | 0.33 | 0.39 |
| C | 32 | 6.8 | 25 | UF 30 | 2.40 | 0.66 | 0.78 | 0.60 |
| D | 9 | 7.5 | 75 | UF 30 | 1.23 | 0.43 | 0.54 | 0.79 |
| E | 26 | 7.5 | 85 | UF 30 | | | | |
| F | 14 | 8.5 | 65 | UF 30 | 2.14 | 0.63 | 0.74 | 0.65 |
| G | 27 | 8.5 | 75 | UF 30 | 1.76 | 0.59 | 0.68 | 0.72 |
| H | 10 | 8.5 | 85 | UF 30 | 1.80 | 0.63 | 0.76 | 0.77 |
| I | 21 | 9.5 | 65 | UF 30 | 2.04 | 0.59 | 0.73 | 0.65 |
| J | 20 | 9.5 | 65 | UF 30 | 1.96 | 0.61 | 0.74 | 0.69 |
| K | 1 | 9.5 | 85 | UF 30 | 1.84 | 0.60 | 0.74 | 0.73 |
| L | 43 | 6.8 | 25 | UF 70 | 1.97 | 0.34 | 0.36 | 0.36 |
| | | | | DF 70 | 1.16 | 0.10 | 0.11 | 0.18 |
| M | 40 | 7.5 | 87 | UF 70 | 0.87 | 0.33 | 0.32 | 0.75 |
| | | | | DF 70 | 0.42 | 0.11 | 0.12 | 0.31 |
| N | 46 | 8.5 | 65 | UF 70 | 0.87 | 0.33 | 0.32 | 0.75 |
| | | | | DF 70 | 2.75 | 0.20 | 0.24 | 0.16 |
| O | 41 | 8.7 | 75 | UF 70 | 1.04 | 0.30 | 0.33 | 0.61 |
| | | | | DF 70 | 0.79 | 0.12 | 0.14 | 0.33 |
| P | 45 | 8.5 | 85 | UF 70 | 1.09 | 0.32 | 0.34 | 0.61 |
| | | | | DF 70 | 0.77 | 0.11 | 0.13 | 0.31 |
| Q | 42 | 9.5 | 65 | UF 70 | 1.25 | 0.30 | 0.34 | 0.51 |
| | | | | DF 70 | 1.08 | 0.12 | 0.14 | 0.24 |
| R | 44 | 9.5 | 87 | UF 70 | 0.99 | 0.31 | 0.36 | 0.68 |
| | | | | DF 70 | 0.76 | 0.12 | 0.16 | 0.37 |

It should be noted that the alpha-lactalbumin and beta-lactoglobulin contents of the permeates listed in Table 10 are the measured content of the monomeric form of these two proteins. Because of possible disulfide bond formation, these proteins, and especially beta-lactoglobulin, may exist as dimers, trimers, or other higher ordered polymers. These polymeric forms could not be distinguished using the HPLC and the analytical methods employed herein, so the discoveries regarding the use of this invention are directed towards the specific recoveries of the monomeric forms of alpha-lactalbumin and beta-lactoglobulin. It may be that a portion, or even the majority, of the other permeate proteins making up the "total" level determination from the HPLC chromatogram are polymers principally involving beta-lactoglobulin.

The discovery that there are less "other proteins" in the permeates of the ultrafiltered milks treated by the invention at the higher temperatures (75° C. and 85° C.) while the recovery of monomeric alpha-lactalbumin and beta-lactoglobulin appears to be at a fixed level, principally dependent upon the choice of membrane porosity, supports an objective of the invention to have more whey protein beneficially retained with the casein and the insoluble minerals. That is, a lower level of total protein in the permeate is a significant processing benefit provided by the invention.

An unexpected finding from the permeate protein data shown in Table 10 is that the monomeric alpha-lactalbumin (and beta-lactoglobulin) recovery was highest in permeates from processing with the 10,000 molecular weight cut-off membrane. The permeate concentration of alpha-lactalbumin was highest when the 10,000 MWCO membrane filter was used and was lowest when the 70,000 MWCO membrane was used, a result which was unexpected from prior art.

Regression analyses on data for the 70,000 MWCO membrane to determine the effects of the pH and temperature pretreatment of the milk on the recovery of alpha-lactalbumin as a high percentage of the total proteins in the permeate showed that: 1) high pH treatment gives a higher percent alpha-lactalbumin, 2) high temperature treatment gives a higher alpha-lactalbumin percentage, and 3) there is a negative two-factor interaction of (pH×temperature). None of these effects could have been predicted from the information on the current state of the art regarding pH and temperature treatments of milk. One might expect closely similar effects on the alpha-lactalbumin content of the permeate protein from 30,000, 10,000, and other membrane processing modules.

It is well known that human milk is the most desirable nutritional fluid for nurturing infants, and human milk contains a much higher level of alpha-lactalbumin than does bovine milk or bovine whey produced by conventional techniques. It is the specific amino acid profile of both human alpha-lactalbumin and bovine alpha-lactalbumin that provides for the desirable nutritional attributes of this particular protein. The current invention provides a process for making a desirable milk protein concentrate as a retentate from UF and DF treatment, and it provides a highly desirable protein composition in the membrane filtration permeate from milk that is first treated under the conditions of this invention.

Recovery of the alpha-lactalbumin enriched whey protein from the permeates of this invention is possible using one or more of the current state of the art technologies involving whey protein precipitation, whey protein complexing with carbohydrates and gums, trapping and recovering the proteins using ion exchange media, or ultrafiltration using very low molecular weight cut-off membrane modules so that the lactose and water are removed in the permeate and the monomeric alpha-lactalbumin and beta-lactoglobulin are recovered in the retentate.

Figure 5:
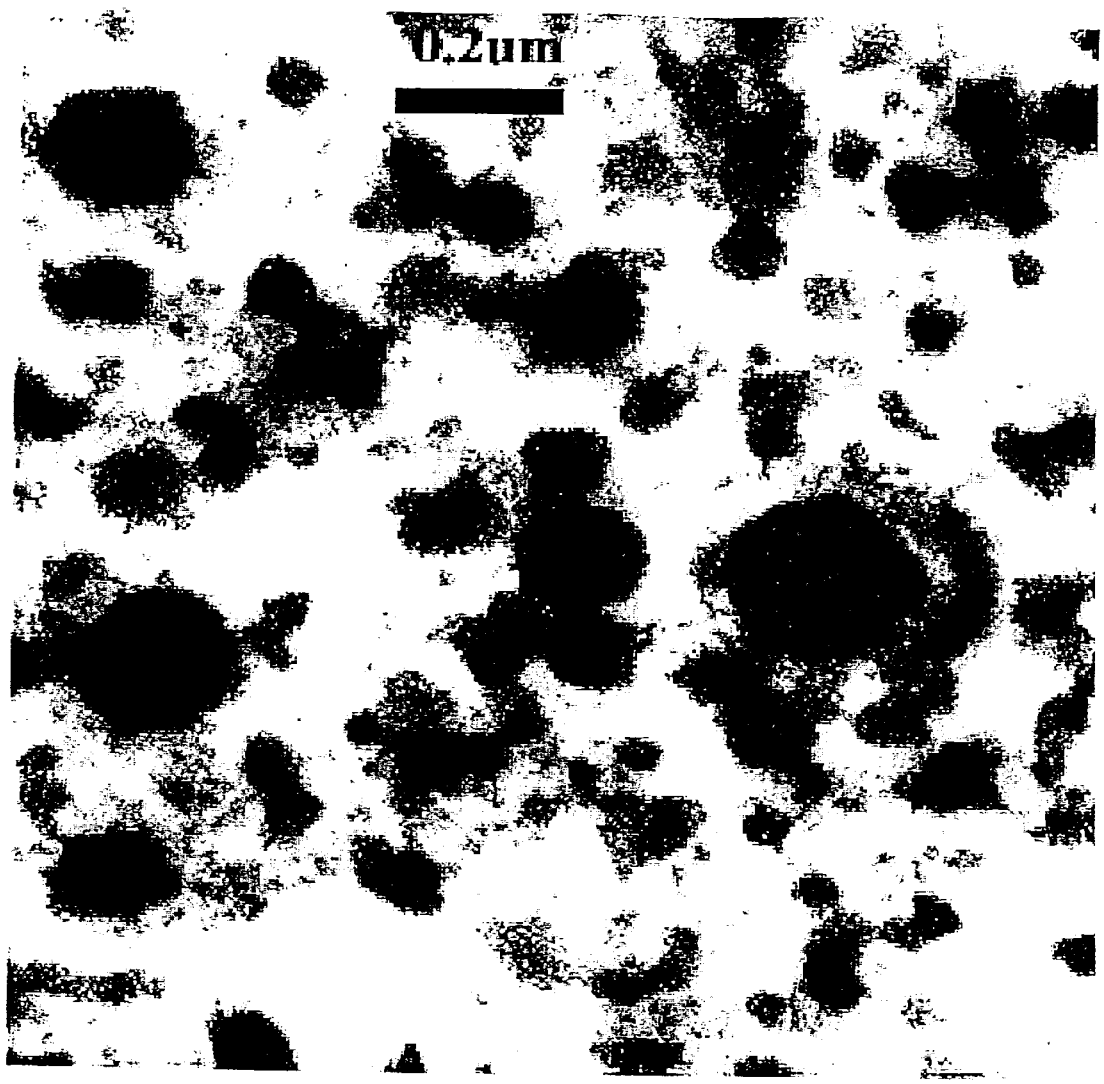
FIG. 5 is a scanning Electron Micrograph of spray dried UF, DF retentate powder from milk preteated at pH 7.5 and 85° C., cooled, adjusted to pH 6.8 with sulfuric acid.
Figure 6:
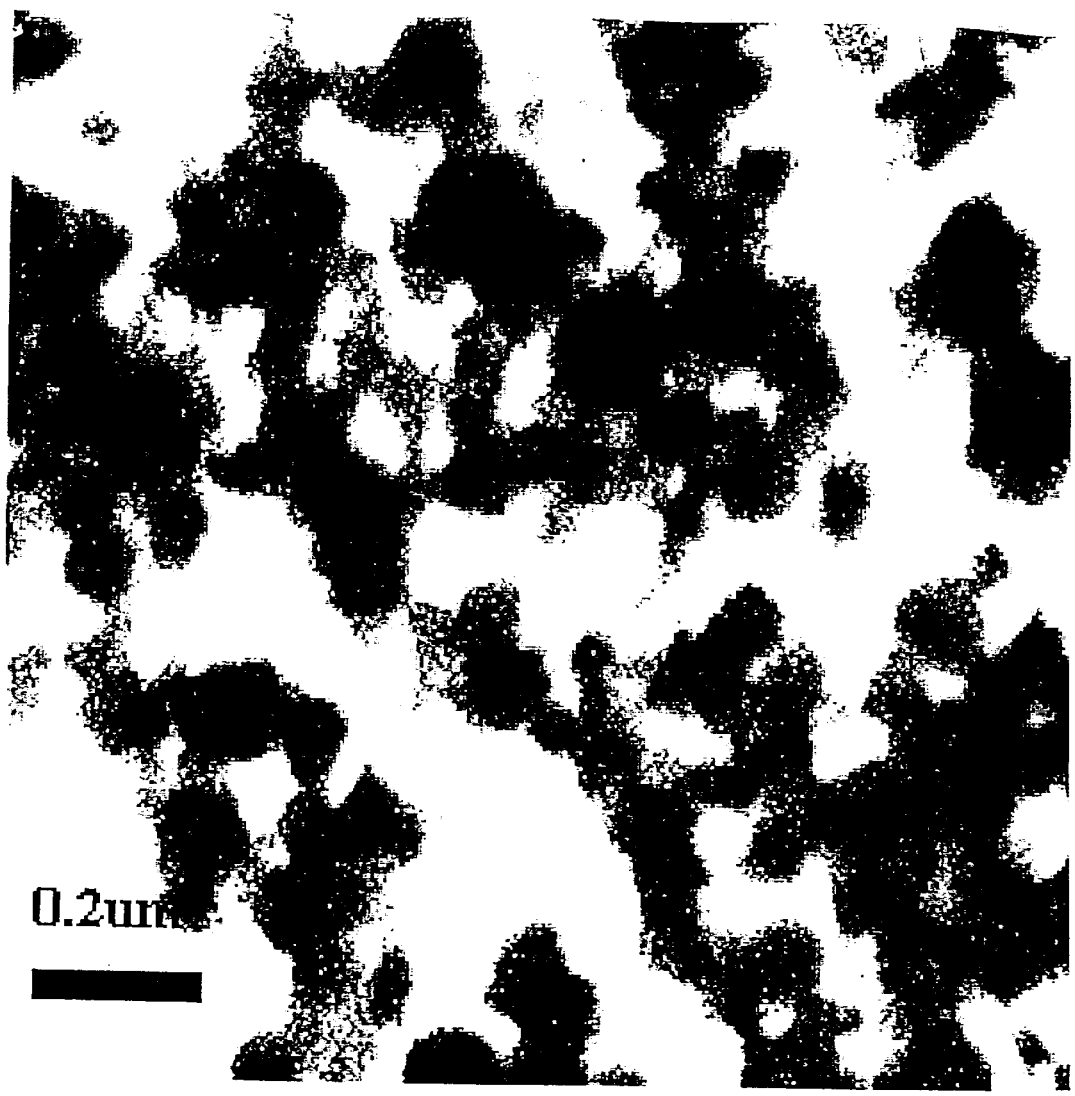
FIG. 6 is a scanning Electron Micrograph of spray dried UF, DF retentate powder from milk preteated at pH 9.5 and 65° C., cooled, adjusted to pH 6.8 with sulfuric acid.
Figure 7:
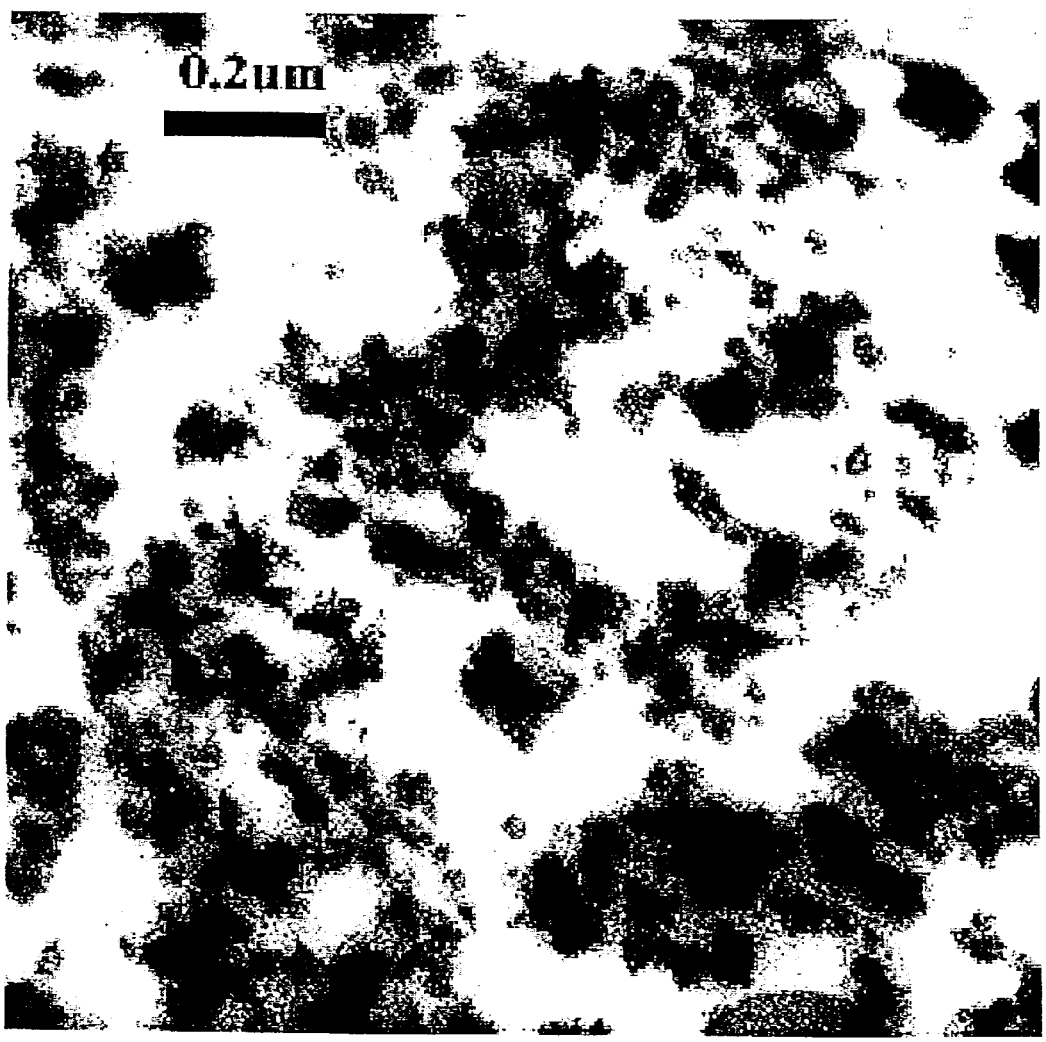
FIG. 7 is a scanning Electron Micrograph of spray dried UF, DF retentate from milk without preteated or pH adjustments.
Figure 8:
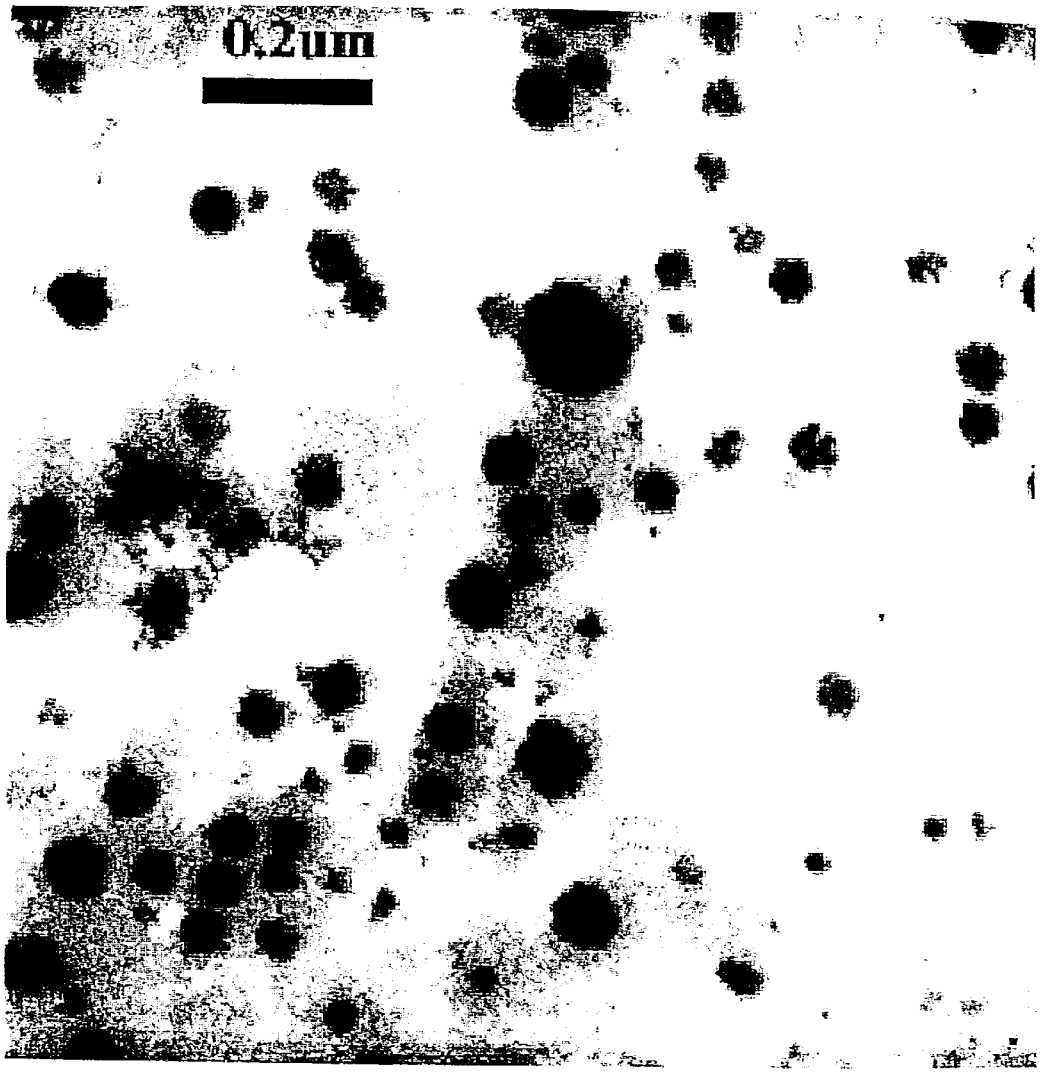
FIG. 8 is a scanning Electron Micrograph of spray dried skim milk.

Retention of the Native Milk Protein Micelle and Alterations to the Micelle Structure The spray dried retentates from ultrafiltering and diafiltering milk pretreated at pH 7.5 and 85° C., milk pretreated at pH 9.5, 65° C. (Example 7B) and untreated (control) milk, (Example 7C) were examined for protein aggregates and either retention or modification of the native milk protein micelles by scanning electron microscopy (SEM). The four photomicrographs (FIGS. 5, 6, 7, and 8) are SEM photographs from the above mentioned powders and from untreated nonfat skim milk, respectively. The skim milk SEM photograph (FIG. 8) shows distinctive, well separated micelles of approximately 0.1 micron diameter. The retentate from UF and DF treatment of the control untreated skim milk (FIG. 7) shows that the micelles from routine, state of the art processing are aggregated to form a rather extensive matrix of protein. However, skim milk that had been treated at pH 7.5 and at 85° C. and then subsequently ultrafiltered and diafiltered showed retention of distinctive, unaggregated micelles of protein and much smaller aggregates of protein micelles than are shown from the retentate of untreated milk (compare FIGS. 5 to 7). This retention of micelles and the appearance of only small aggregates of protein micelles may account for the improved cold water solubility as a benefit of this invention. The dried retentate from milk that had been pretreated at pH 9.5 and 65° C., FIG. 6, shows very few large individual micelles (of the order of 0.1 micron), but rather shows an extensive network of 0.02 to 0.05 micron diameter protein aggregates. These extended aggregates appear to be as large or larger than the aggregates of the retentate from untreated milk (FIG. 7). The retentate with the aggregates of proteins reduced in size from the native micelle shows a new state, different from native nonfat dry milk and different from the ultrafiltered retentate of untreated milk. This extended matrix of protein may account for the high viscosity of retentates treated at pH 9.5. Thus, the invention can result in the preservation of the milk micelle or can result in the reduction of the micelle to perhaps submicelles with an apparent aggregation of these smaller units together to form some type of protein matrix depending on the alkali and the temperature treatment of the milk prior to UF and DF and subsequent drying.

What is claimed is:

1. A process for preparing from milk a composition, comprising:
   (a) adjusting the pH of said milk into the range of about 7.5 to 10.0;
   (b) heating the pH adjusted milk to a temperature in the range of about 60–90° C.;
   (c) cooling the heated pH adjusted milk to a temperature in the range of about 5–55° C.; and
   (d) subjecting the cooled, pH adjusted milk to further pH adjusting into the range of about 7.0 to 5.5.

2. A process in accordance with claim 1 where the pH adjusted milk is heated for 5–30 minutes.

3. A process in accordance with claim 1 where in step (a) adjusting the pH into the range of about 7.5 to 10.0 is accomplished with an alkali selected from the group consisting of ammonia, hydroxides of sodium, calcium, magnesium and potassium and alkaline metal salts.

4. A process in accordance with claim 1 where in step (d) pH adjustment into the range of about 7.0 to 5.5 is accomplished with an acid selected from the group consisting of hydrochloric, sulfuric, phosphoric, acetic, lactic and citric acids, and acidic salts thereof.

5. A process in accordance with claim 1 where in step (a) the pH adjustment is into the range of about 7.5 to 8.5.

6. A process in accordance with claim 1 where in step (d) the pH adjustment is to about 7.0 to 6.0.

7. A process in accordance with claim 1 where the heating is carried out for about 5 to 15 minutes.

8. A process in accordance with claim 1 where the heating temperature is in the range of 75 to 85° C.

9. A process in accordance with claim 1 where in step (c) the milk is cooled to a temperature of about 15° C.

10. A process in accordance with claim 6 where in step (d) the pH adjustment is to about 6.2.

11. A process in accordance with claim 1 further comprising the step of drying the composition to provide a powdered product.

12. A process for preparing a protein concentrate with reduced lactose, from milk containing lactose, comprising:
   (a) adjusting the pH of said milk into the range of about 7.5 to 10.0;
   (b) heating the pH adjusted milk to a temperature in the range of about 60–90° C.;
   (c) cooling the heated pH adjusted milk to a temperature in the range of about 5–55° C.;
   (d) subjecting the cooled, pH adjusted milk to further pH adjustment into the range of about 7.0 to 5.5; and
   (e) subjecting the milk subjected to further pH adjustment to membrane filtration to separate a protein-enriched retentate from a lactose enriched permeate.

13. A process in accordance with claim 12 where in step (b) the pH adjusted milk is heated for 5–30 minutes.

14. A process in accordance with claim 12 where in step (a) adjusting the pH is accomplished with an alkali selected from the group consisting of ammonia, hydroxides of sodium, calcium, magnesium and potassium and alkaline metal salts.

15. A process in accordance with claim 12 where in step (d) the further pH adjustment is accomplished with an acid selected from the group consisting of hydrochloric, sulfuric, phosphoric, acetic, lactic and citric acids, and acidic salts thereof.

16. A process in accordance with claim 12 where in step (a) the pH adjustment is into the range of about 7.5 to 8.5.

17. A process in accordance with claim 12 where in step (d) the further pH adjustment is to about 6.5 to 6.0.

18. A process in accordance with claim 12 where in step (b) the heating is carried out for about 5 to 15 minutes.

19. A process in accordance with claim 12 where in step (b) the heating temperature is in the range of 75 to 85° C.

20. A process in accordance with claim 12 where in step (c) the heated pH adjusted milk is cooled to a temperature of about 15° C.

21. A process in accordance with claim 17 where in step (d) the further pH adjustment is to about 6.2.

22. A process in accordance with claim 12 further comprising the step of drying the protein-enriched retentate to provide a powdered product.

23. A process in accordance with claim 12 where the membrane filtration is ultrafiltration.

24. A process in accordance with claim 23 further comprising the step of diafiltration following ultrafiltration.

25. In an membrane filtration process for obtaining a milk protein concentrate from milk, in which a protein-enriched retentate is separated from a lactose enriched permeate by membrane filtration, the improvement comprising adjusting said milk to a pH in the range of about 7.0 to 10.0, heating said pH adjusted milk to a temperature in the range of about 60–90° C., and subjecting the cooled, pH adjusted milk to further pH adjustment into the range of about 7.0 to 5.5.

26. A membrane filtration process in accordance with claim 25, wherein said pH adjusment and heating are accomplished prior to membrane filtration.

27. A membrane filtration process in accordance with claim 25 wherein the filtration is ultrafiltration.

28. A membrane process in accordance with claim 25 wherein said pH adjustment and heating are accomplished after the membrane filtration.

29. A process for preparing from milk, a composition with an increased calcium to protein ratio, comprising:
   adjusting the pH of said milk into the range of pH 7.5 to 10.0 using a calcium containing alkaline agent in the presence of magnesium oxide, magnesium hydroxide, or a magnesium salt; and
   adding a neutralizing acidulant to adjust the pH into the range of 7.0 to 5.5.

30. A process in accordance with claim 29 where the calcium containing alkaline agent consists of calcium oxide or calcium hydroxide.

31. A process in accordance with claim 29 where the neutralizing acidulent is phosphoric, sulfuric, hydrochloric, citric, or lactic acid or any alkaline metal salt or alkaline earth salt capable of lowering the pH of said alkali treated milk.

32. A process for preparing from milk, a milk protein composition which, when dissolved in water at about 25° C. and at about 14% protein in the water, has a viscosity at least ten fold greater than the viscosity of a comparable, but untreated milk protein composition, comprising:
   adjusting the pH of said milk into the range of 9.0 to 10.0;
   heating the pH adjusted milk in the range of 80 to 100° C.;
   cooling the heated, pH adjusted milk into the range of about 5–55° C.;
   adjusting the pH of said cooled composition into the range of pH 7.5 to 5.5; and
   drying the cooled composition.

33. A process in accordance with claim 32 wherein the cooled composition is concentrated for its protein content prior to drying.

34. The process of claim 3 wherein said alkaline metal salts are selected from the group consisting of alkaline metal phosphate, citrate and carbonate.

35. The process of claim 14 wherein said alkaline metal salts are selected from the group consisting of alkaline metal phosphate, citrate and carbonate.

* * * * *